(12) United States Patent
Fei

(10) Patent No.: US 10,705,851 B2
(45) Date of Patent: Jul. 7, 2020

(54) SCHEDULING THAT DETERMINES WHETHER TO REMOVE A DEPENDENT MICRO-INSTRUCTION FROM A RESERVATION STATION QUEUE BASED ON DETERMINING CACHE HIT/MISS STATUS OF ONE ORE MORE LOAD MICRO-INSTRUCTIONS ONCE A COUNT REACHES A PREDETERMINED VALUE

(71) Applicant: Shanghai Zhaoxin Semiconductor Co., Ltd., Shanghai (CN)

(72) Inventor: Xiaolong Fei, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 133 days.

(21) Appl. No.: 16/149,706

(22) Filed: Oct. 2, 2018

(65) Prior Publication Data

US 2019/0235876 A1 Aug. 1, 2019

(30) Foreign Application Priority Data

Jan. 30, 2018 (CN) .......................... 2018 1 0088159

(51) Int. Cl.
*G06F 9/38* (2018.01)
*G06F 9/30* (2018.01)
*G06F 12/0875* (2016.01)

(52) U.S. Cl.
CPC ........ *G06F 9/3861* (2013.01); *G06F 9/30043* (2013.01); *G06F 12/0875* (2013.01); *G06F 2212/452* (2013.01)

(58) Field of Classification Search
CPC .. G06F 9/3838; G06F 9/3861; G06F 12/0875; G06F 9/30043; G06F 2212/452;

(Continued)

(56) References Cited

U.S. PATENT DOCUMENTS 5,778,210 A * 7/1998 Henstrom ............. G06F 9/3836
712/215
6,094,717 A * 7/2000 Merchant ............. G06F 9/3836
712/244

(Continued)

FOREIGN PATENT DOCUMENTS

CN 104808996 A 7/2015

OTHER PUBLICATIONS

Pier, JK et al. Bloom Filtering Cache Misses for Accurate Data Speculation and Prefetching. ACM ICS Jun. 2002, pp. 347-356 [online], [retrieved on Feb. 17, 2020], Retrieved from the Internet <URL: https://dl.acm.Org/doi/abs/10.1145/2591635.2667183 >.*

(Continued)

*Primary Examiner* — Aimee Li
*Assistant Examiner* — Shawn Doman
(74) *Attorney, Agent, or Firm* — McClure, Qualey & Rodack, LLP

(57) ABSTRACT

A method for scheduling micro-instructions, performed by a first qualifier, is provided. The method includes the following steps: detecting a write-back signal broadcasted by a second qualifier; determining whether a value of a first load-detection counting logic is to be synchronized with a value of a second load-detection counting logic carried by the write-back signal according to content of the write-back signal; determining whether execution statuses of all load micro-instructions are cache hit when the synchronized value of the first load-detection counting logic reaches a predetermined value; and driving a release circuit to remove a micro-instruction in a reservation station queue when the execution statuses of the all load micro-instructions are cache hit and the micro-instruction has been dispatched to an arithmetic and logic unit for execution.

14 Claims, 9 Drawing Sheets

(58) Field of Classification Search
CPC ......... G06F 2212/1024; G06F 12/0897; G06F 9/3836; G06F 9/3824
USPC .................................... 712/244, 216, 217
See application file for complete search history.

(56) References Cited

U.S. PATENT DOCUMENTS

| | | | | |
|---|---|---|---|---|
| 6,728,843 | B1* | 4/2004 | Pong | G06F 12/0828 711/150 |
| 6,912,648 | B2* | 6/2005 | Hammarlund | G06F 9/3842 712/219 |
| 6,950,925 | B1* | 9/2005 | Sander | G06F 9/3842 712/215 |
| 7,111,153 | B2* | 9/2006 | Kuttanna | G06F 9/383 710/36 |
| 7,200,737 | B1* | 4/2007 | Merchant | G06F 9/383 712/218 |
| 7,363,470 | B2* | 4/2008 | Filippo | G06F 9/383 712/218 |
| 7,861,066 | B2* | 12/2010 | Dhodapkar | G06F 9/3836 712/214 |
| 8,918,625 | B1* | 12/2014 | O'Bleness | G06F 9/3834 712/214 |
| 9,921,833 | B2* | 3/2018 | Bowman | G06F 9/3865 |
| 2003/0126417 | A1* | 7/2003 | Sprangle | G06F 9/3836 712/235 |
| 2007/0083742 | A1* | 4/2007 | Abernathy | G06F 9/3861 712/244 |
| 2009/0222625 | A1* | 9/2009 | Ghosh | G06F 9/383 711/130 |
| 2010/0049954 | A1* | 2/2010 | Shmueli | G06F 9/30094 712/226 |
| 2015/0026685 | A1* | 1/2015 | Spadini | G06F 9/3836 718/102 |
| 2016/0328237 | A1 | 11/2016 | Di et al. | |
| 2017/0109172 | A1* | 4/2017 | Sleiman | G06F 9/3838 |

OTHER PUBLICATIONS

Kessler, RE. The Alpha 21264 Microprocessor. IEEE Micro, vol. 19, No. 2, Mar. 1/Apr. 1999, pp. 24-36 [online], [retrieved on Feb. 18, 2020], Retrieved from the Internet <URL: https://ieeexplore.ieee.org/stamp/stamp.jsp?tp=&arnumber=755465 >.*

* cited by examiner

SCHEDULING THAT DETERMINES WHETHER TO REMOVE A DEPENDENT MICRO-INSTRUCTION FROM A RESERVATION STATION QUEUE BASED ON DETERMINING CACHE HIT/MISS STATUS OF ONE ORE MORE LOAD MICRO-INSTRUCTIONS ONCE A COUNT REACHES A PREDETERMINED VALUE

CROSS REFERENCE TO RELATED APPLICATIONS

This Application claims priority of China Patent Application No. 201810088159.1, filed on Jan. 30, 2018, the entirety of which is incorporated by reference herein.

BACKGROUND OF THE INVENTION

Field of the Invention

The invention relates to a microprocessor technology, and more particularly to a method for scheduling micro-instructions and an apparatus using the same.

Description of the Related Art

For current superscalar microprocessors, a reservation station is responsible for scheduling all micro-instructions. Except for load micro-instructions, the delay of the execution of the most micro-instructions is fixed. Memory systems in microprocessors typically employ a hierarchical architecture, including: a Level-1 data cache, a Level-2 data cache, and a main memory. Since a miss may occur in the Level-1 data cache (referred to as "L1 cache miss") when a load micro-instruction is executed, the delay is variable. Some arithmetic logic micro-instructions depend on the load micro-instruction, that is, the arithmetic logic micro-instructions require the execution result of the load micro-instruction as its source operand. In order to simplify the design, a conventional reservation station usually also regards the delay of the execution of a load micro-instruction as a fixed value. That is, the reservation station assumes that a result can be obtained at the $n^{th}$ clock cycle which occurs after a load micro-instruction is dispatched to the load pipeline. Therefore, the reservation station dispatches a following arithmetic logic micro-instruction depending on the load micro-instruction to the arithmetic and logic unit (ALU) at the $(n-2)^{th}$ clock cycle after the load micro-instruction is dispatched to the load pipeline, and further clears the arithmetic logic micro-instruction in the corresponding queue. When a miss occurs in the cache (cache miss) after the $n^{th}$ clock cycles after the load micro-instruction is dispatched, the arithmetic logic micro-instruction that has been dispatched to the arithmetic and logic unit would fail because the data is not ready yet, resulting that the reservation station needs to replay the arithmetic logic micro-instruction. However, replaying the arithmetic logic micro-instruction may take a lot of time and reduce the performance of the microprocessor. Therefore, a method for scheduling arithmetic logic micro-instructions and an apparatus using the same to avoid replaying the arithmetic logic micro-instructions due to cache misses.

BRIEF SUMMARY OF THE INVENTION

An exemplary embodiment of a method for scheduling micro-instructions is provided. The method is performed by a first qualifier and comprises the steps of detecting a write-back signal broadcasted by a second qualifier; determining whether a value of a first load-detection counting logic is to be synchronized with a value of a second load-detection counting logic carried by the write-back signal according to content of the write-back signal; determining whether execution statuses of all load micro-instructions are cache hit when the synchronized value of the first load-detection counting logic reaches a predetermined value; and driving a release circuit to remove a micro-instruction in a reservation station queue when the execution statuses of the all load micro-instructions are cache hit and the micro-instruction has been dispatched to an arithmetic and logic unit for execution.

An exemplary embodiment of a scheduler device for micro-instructions is provided. The scheduler comprises a reservation station queue, a release circuit, and a first qualifier. The release circuit is coupled to the reservation station queue. The first qualifier is coupled to the release circuit. The first qualifier detects a write-back signal broadcasted by a second qualifier and determines whether a value of a first load-detection counting logic is to be synchronized with a value of a second load-detection counting logic carried by the write-back signal according to content of the write-back signal. The first qualifier determines whether execution statuses of all of load micro-instructions are cache hit when the synchronized value of the first load-detection counting logic reaches a predetermined value and drives the release circuit to remove the first micro-instruction in the reservation station queue when the execution statuses of all of the load micro-instructions are cache hit and the first micro-instruction has been dispatched to an arithmetic and logic unit for execution.

In an exemplary embodiment, the qualifier is associated with the micro-instruction, and the micro-instruction depends on one or a plurality of load micro-instructions executed by the load execution unit.

According to the above method and device for scheduling micro-instructions, the micro-instruction in the reservation station queue is retained, which avoids a replay operation.

In addition, it is worth noted that since the execution state broadcasted by the load execution unit does not carry any unique identification code, the above method and device for scheduling micro-instructions of the present invention ensures the micro-instruction associated with the qualifier in which the load-detection counting logic reaches the predetermined value must directly or indirectly depend on the load micro-instruction corresponding to the execution state broadcasted by the load execution unit through the load-detection counting logic of the present invention.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

It should be understand that, in this specification, the terms "including", "comprising", and the like are used to indicate the presence of particular features, values, method steps, operation processing, elements, and components, but it is not excludes that more technical features, values, method steps, operation processing, elements, components, or any combination thereof may be added.

The terms, such as "first," "second," and "third," recited in the claims are used to describe elements of the claims, and are not intended to indicate the priority order, the precedence relationship, the order in which one element precedes another, or the chronological order for executing the method steps, only to distinguish elements with the same name.

Figure 1:
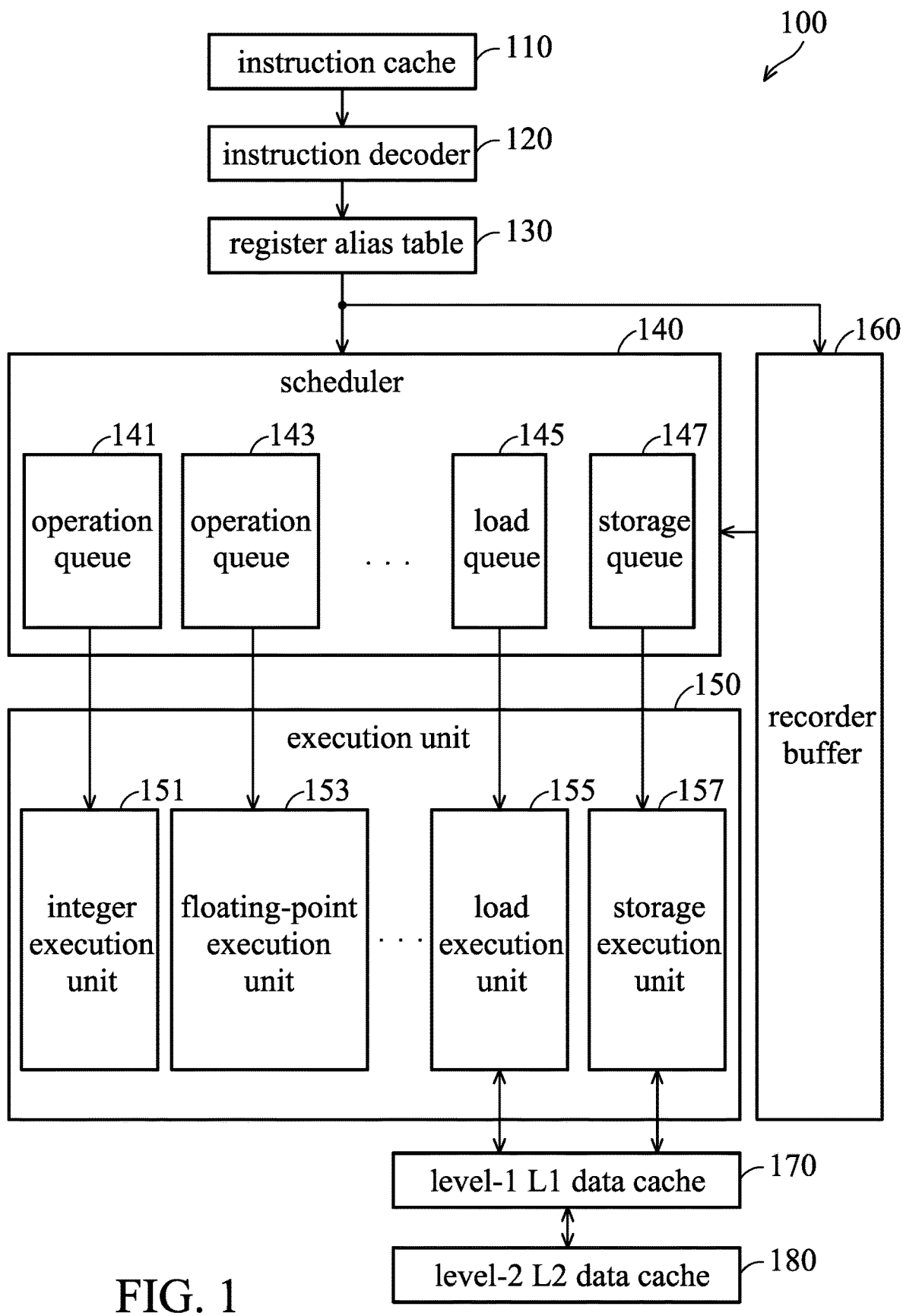
FIG. 1 is a block diagram of a superscalar microprocessor according to an embodiment of the present invention.

FIG. 1 is a block diagram of a superscalar microprocessor according to an embodiment of the present invention. The microprocessor 100 comprises an instruction cache 110 for caching macro-instructions with an instruction set architecture, such as the x86 instruction set architecture. An instruction decoder 120 receives the macro-instructions from the instruction cache 110 and translates the macro-instructions into micro-instructions. A register alias table 130 transfers the micro-instructions to reservation station queues 141~147 in a scheduler 140 and to a recorder buffer (ROB) 160 in a program order according to the micro-instruction dependency. In some embodiments, reservation station queues 141~147 may be implemented as independent queues. In other embodiments, the reservation station queues 141~147 may be implemented in a unified queue but use different ports. An execution unit 150 may comprise an integer execution unit 151, a floating-point execution unit 153, a load execution unit 155, and a storage execution unit 157. It should be noted that in addition to the execution units described above, the execution unit 150 may further comprises other execution units, for example, a branch unit, a single-instruction-multiple-data (SIMD) execution unit, a special function units (SFU), etc. Conceptually, the integer execution unit 151, the floating-point execution unit 153, the single-instruction-multiple-data execution unit, and the special function unit can all included in an arithmetic and logic unit (ALU), and their functions are different from the functions of the load execution unit 155 and the storage execution unit 157. The operation queues 141 and 143, the load queue 145, and the storage queue 147 are connected to the integer execution unit 151, the floating-point execution unit 153, the load execution unit 155, and the storage execution unit 157, respectively. The micro-instructions in the operation queues 141 and 143, the load queue 145, and the storage queue 147 may be dispatched to the integer execution unit 151, the floating-point execution unit 153, the load execution unit 155, and the storage execution unit 157, respectively. It should be noted that the execution results of the integer execution unit 151, the floating-point execution unit 153, the load execution unit 155, and the storage execution unit 157 are out of order. Thus, each micro-instruction contains a unique identifier, for example, reorder buffer indexes (ROBs), physical register file indexes (PRFs), and the like, which are used to allow execution results to be arranged in the original execution order. The load execution unit 155 is connected to a level-1 L1 data cache 170, and a level-2 L2 data cache 180 is disposed after the first level data cache. The level-2 L2 data cache 180 reads data from a main memory (not shown in FIG. 1) through a bus interface (not shown in FIG. 1) and writes data to the main memory. The bus interface connects the microprocessor 100 to a bus, for example, a local bus, a memory bus, and the like.

The load execution unit 155 is a pipeline. When executing micro-instructions, the load execution unit 155 requests data of a memory address from the level-1 L1 data cache 170 first. If the level-1 L1 data cache 170 has temporarily stored the data of the memory address (that is, a hit occurs in the level-1 L1 data cache 170, referred to as "L1 cache hit"), the data is stored to a specified location, such as a specified register. If the level-1 L1 data cache 170 does not temporarily store the data of the memory address (that is, a miss occurs in the level-1 L1 data cache 170, also referred to as "L1 cache miss"), the load execution unit 155 requests the data of the memory address from the level-2 L2 data cache 180. If the level-2 L2 data cache 180 has temporarily stored the data of the memory address (that is, a hit occurs in the level-2 L2 data cache 180, referred to as "L2 cache hit"), the data is returned to the level-1 L1 data cache 170. If the second level data cache 180 also does not temporarily store the data of the memory address (that is, a miss occurs in the level-2 L2 data cache 180, referred to as "L2 cache miss"), the data is read from the main memory (not shown in FIG. 1) through the bus interface (not shown in FIG. 1). Therefore, those skilled in the art understand that the data required for the load micro-instructions cannot necessarily be acquired and stored at the destination location within a predetermined time (for example, n clock cycles).

There are various dependencies among the micro-instructions executed by the integer execution unit 151, the floating-point execution unit 153, the load execution unit 155, and the storage execution unit 157. A common dependency is that a source operand of an integer or floating-point arithmetic micro-instruction comes from the result of a load micro-instruction, for example:

A1=LD [Addr1];
A3=IADD A1, A2;
B=IMUL A3, "3";

wherein, LD represents a load micro-instruction, IADD represents an integer addition micro-instruction, IMUL represents an integer multiplication micro-instruction, Addr1 represents a memory address, and A1-A3 and B1 represent specific registers. The load execution unit 155 executes the load micro-instruction "A1=LD [Addr1];" to obtain data from the memory address Addr1 and store it in the register A1. The load execution unit 155 comprises a pipeline and obtains the data of the memory address Addr1 through the level-1 L1 data cache 170. It should be noted here that the memory address Addr1 may be temporarily stored in the level-1 L1 data cache 170 or the level-2 L2 data cache 180 or may be only stored in the main memory (not shown in FIG. 1). The integer execution unit 151 executes the micro-instruction "A3=IADD A1, A2;" to add the value of the register A1 (that is, the data of the memory address Addr1) to the value of the register A2 and store the operation result in the register A3. Next, the integer execution unit 151 executes the micro-instruction "B=IMUL A3, "3";" to multiply the value of the register A3 (that is, the operation result of the IADD micro-instruction) by a constant "3" and store the operation result in the register B. The operand "A1" of the micro-instruction "A3=IADD A1, A2;" directly depends on the load micro-instruction "A1=LD [Addr1];", while the operand "A3" of the micro-instruction "B1=IMUL A3, "3";" indirectly depends on the load micro-instruction "A1=LD [Addr1];". Although the integer addition and the multiplication are given as an example in the embodiment, the dependency as described above can also be applied to other arithmetic/logic micro-instructions, special function micro-instructions, etc., and the present invention is not limited thereto. The arithmetic/logic micro-instructions can indicate integer subtraction/division, floating-point addition/subtraction/multiplication/division, logic and/or/not, bit left/right shifting, bit rotation, logical comparison, and so on. The special function micro-instructions can indicate the trigonometric functions sine/cosine/Tan/Cot/Sec/Csc( ), the square, the power of n, the square root, the $n^{th}$ root and so on.

In a normal case, the load execution unit 155 can acquire the data of the memory address Addr1 via the level-1 L1 data cache 170 at the $n^{th}$ clock cycle. In some embodiments, for the consideration for overall performance, at the $(n-2)^{th}$ clock cycle occurring after the scheduler 140 dispatches the micro-instruction "A1=LD [Addr1];" to the load execution unit 155 (hereinafter referred to as the $(n-2)^{th}$ clock cycle), the scheduler 140 dispatches the micro-instruction "A3=IADD A1, A2;" to the integer execution unit 151. It is assumed that the micro-instruction "A3=IADD A1, A2;" can be successfully executed at the next clock cycle after being dispatched to the integer execution unit 151 (hereinafter referred to as the $(n-1)^{th}$ clock cycle): the scheduler 140 removes the micro-instruction "A3=IADD A1, A2;" from the operation queue 141. Next, the scheduler 140 dispatches the micro-instruction "B1=IMUL A3, "3";" at the $(n-1)^{th}$ clock cycle. At the $n^{th}$ clock cycle, if a miss occurs in the data cache (cache miss), the execution of the micro-instruction "A3=IADD A1, A2" failed because the load execution unit 155 has not yet obtained the data of the memory address Addr1. Also, because the execution of the micro-instruction "A3=IADD A1, A2;" is failed, the integer execution unit 151 fails to execute the micro-instruction "B1=IMUL A3, "3";". However, at the $n^{th}$ clock cycle, the micro-instruction "A3=IADD A1, A2;" has been removed from the operation queue 141. Thus, scheduler 140 must perform a re-dispatch operation, including fetching the integer addition micro-instruction from the reorder buffer 160, inserting the integer addition micro-instruction into the appropriate location in the operation queue 141, and the like. It should be noted that the performing the re-dispatch operation will consume a lot of time and computing resources, which reduces the overall system performance.

Figure 2:
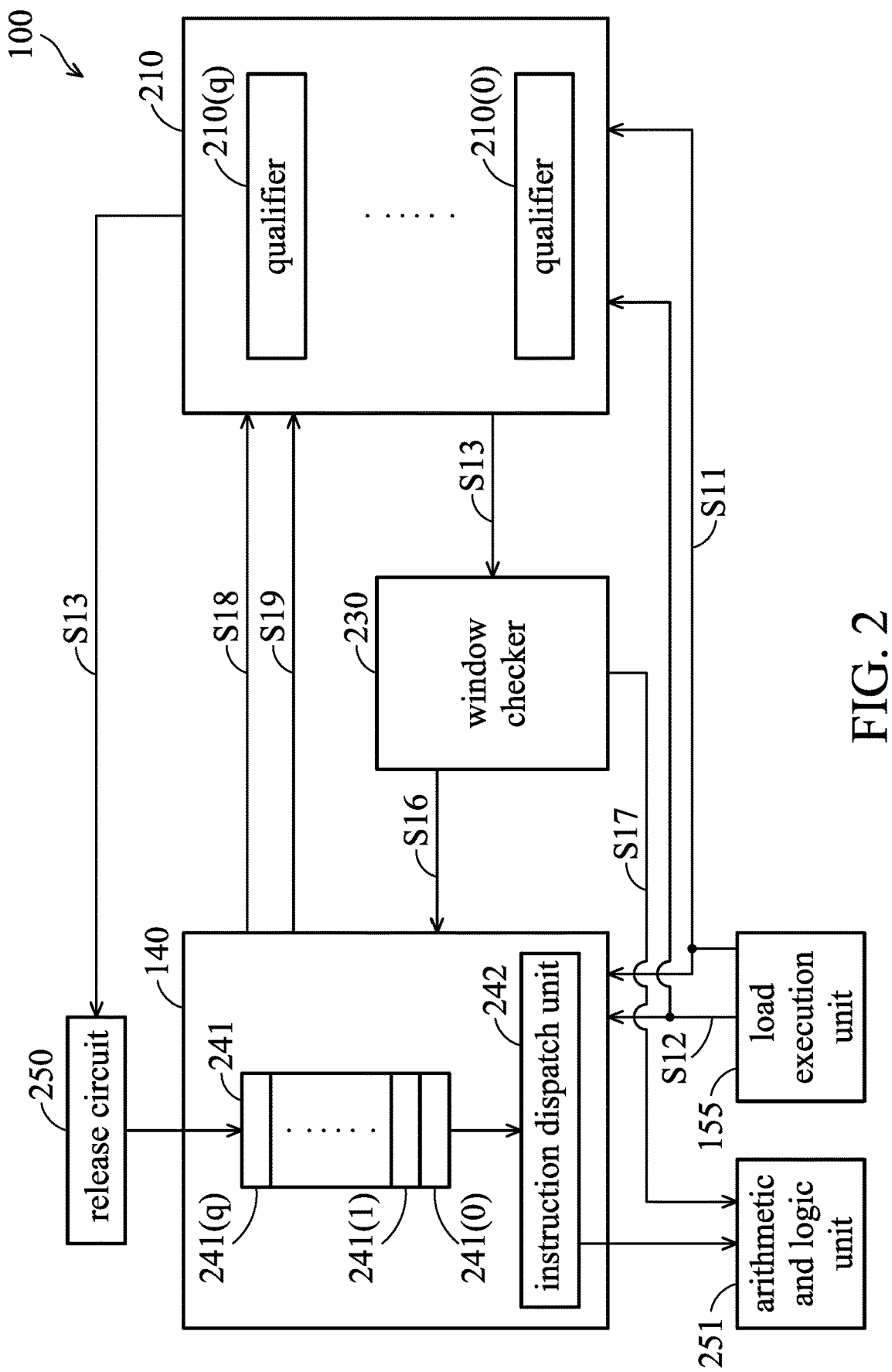
FIG. 2 is a block diagram of a superscalar microprocessor according to an embodiment of the present invention.

FIG. 2 is a block diagram of a superscalar microprocessor according to an embodiment of the present invention. A reservation station queue 241 contains a plurality of entries 241(0)~241(q), wherein the total number of entries in the reservation station queue 241 is q+1. Each entry stores information related to one micro-instruction that can be executed by an arithmetic and logic unit 251, such as micro-instruction identification codes, opcodes, operands, whether the operands have been woken up, and the like. The arithmetic and logic unit 251 comprises, but is not limited to, the integer execution unit 151, the floating-point number execution unit 153, the single-instruction-multiple-data execution unit, the special function unit, and the like shown in FIG. 1. The scheduler 140 (which may be implemented by the reservation station) further comprises an instruction dispatch unit 242 that uses a scheduling algorithm for each clock cycle to select one of a plurality of micro-instructions based on the information contained in the entries, and then dispatches the selected micro-instruction to the arithmetic and logic unit 251 at the next clock cycle. The arithmetic and logic unit 251 can execute micro-instructions, such as example, EX0, EX1, WB, and the like, in several stages. A specific hardware circuit is used for processing in each stage. In order to avoid performing the re-dispatch operation as described above, the microprocessor 100 further comprises a qualifier collection 210, and the qualifier collection 210 comprises a plurality of qualifiers 210(0)~210(q). Each of the qualifiers uniquely corresponds to one entry in the reservation station queue 241 for determining whether the operands of the micro-instruction in the corresponding entry are ready and whether the load micro-instruction on which the operands depend (directly or indirectly) has been confirmed. In an embodiment, a portion of the qualifier collection 210 may be disposed within the scheduler 140, wherein, each micro-instruction may contain a plurality of operands directly or indirectly depending on the execution result of the load micro-instruction, for example, the operand "A1" of the micro-instruction "A3=IADD A1, A2;" depends on the execution result of the load micro-instruction "A1=LD [Addr1];".

At the $(n-2)^{th}$ clock cycle occurring after the load instruction dispatch unit (not shown in FIG. 2) dispatches a load micro-instruction to the load execution unit 155, the load execution unit 155 broadcasts a load write-back signal S11 to all of the qualifiers 210(0)~210(q) and the scheduler 140, wherein the purpose of the load write-back signal S11 is to inform that all operands in the scheduler 140 which depend on the load micro-instruction are ready, that is, the dependency have been released. The load write-back signal S11 carries the unique identifier of the load micro-instruction. The unique identifier can uniquely identify the load micro-instruction, such as a reorder buffer index (ROB), a physical register file index (PRF) and more. In theory, the scheduler 140 receives the load write-back signal S11 at the $(n-2)^{th}$ clock cycle, so that the instruction dispatch unit 242 can select a micro-instruction that depends on the execution result of the load micro-instruction from the reservation station queue 241. For example, the scheduler 140 sets the operands of the micro-instruction that depends on the load micro-instruction to be ready according to the load write-back signal S11. If all of the operands of the micro-instruction are ready at the $(n-1)^{th}$ clock cycle, the instruction dispatch unit 242 may select the micro-instruction and dispatch the selected micro-instruction to the arithmetic and logic unit 251. For example, the scheduler 140 receives the load write-back signal S11, which contains the unique identifier of the load micro-instruction "A1=LD [Addr1]", at the $(n-2)^{th}$ clock cycle. If the qualifier of the micro-instruction "A3=IADD A1, A2;" determines that the unique identification code on which it depends is equal to the unique identification code contained in the load write-back signal S11, and then, if all the operands of the micro-instruction "A3=IADD A1, A2;" are ready at the $(n-1)^{th}$ clock cycle, the instruction dispatch unit 242 selects the micro-instruction "A3=IADD A1, A2;" from the reservation station queue 241, dispatches the micro-instruction "A3=IADD A1, A2;" to the arithmetic and logic unit 251 at the $n^{th}$ clock cycle, and selects the micro-instruction "B1=IMUL A3, "3";" from the reservation station queue 241 (because all the operands of the micro-instruction "B1=IMUL A3, "3";" are ready at the $n^{th}$ clock cycle).

When each of the qualifiers 210(0)~210(q) receives the load write-back signal S11, it determines whether the unique identification code on which its operands depend is equal to the unique identifier of the load instruction contained in the load write-back signal S11, that is, it determines whether one of the source operands of the micro-instruction of the corresponding entry depends on the execution result of the load micro-instruction. If so, a load-detection counting logic is triggered. When the value of the triggered load-detection counting logic reaches a predetermined value (for example, a value of 2, indicating that the second clock cycle which occurs after the load write-back signal S11 of the load instruction is broadcasted by the load execution unit 155 is reached), and the micro-instruction associated with the qualifier 210(i) has been dispatched to the arithmetic and logic unit 251 for execution (e.g., at the $(n-1)^{th}$ clock cycle, the micro-instruction is selected from the reservation station queue 241 by the instruction dispatch unit 242 and dispatched to the arithmetic and logic unit 251 for execution). When a cache hit is found for the load micro-instruction through a cache access status signal S12 broadcasted by the load execution unit 155, the qualifiers 210(i) generates a signal S13 indicating a load-confirmed to drive a release circuit 250 to remove micro-instruction of the entry 241(i) in the reservation station queue 241, where i is an integer between 0 and q. When a cache miss is found for the load micro-instruction through the cache access status signal S12 broadcasted by the load execution unit 155, the qualifiers 210(i) generates the signal S13 indicating a load-unconfirmed. The hardware architecture and detailed operation of the qualifier 210(i) can refer to the following paragraphs. It should be noted that the above-mentioned process of determining whether a cache hit occurs must be after the micro-instruction is selected by the instruction dispatch unit 242 from the reservation station queue 241 and dispatched to the arithmetic and logic unit 251 for execution and be executed by the qualifiers 210(i) associated with the micro-instruction. This is because a ready signal is set for the micro-instruction when it is determined to trigger the aforementioned load-detection counting logic. However, since there several operands in a micro-instruction, the micro-instruction will be selected and dispatched to the arithmetic and logic unit 251 for execution only when all of the ready signals for the micro-instruction are set. When the value of the triggered load-detection counting logic reaches the predetermined value (for example, indicating that the second clock cycle which occurs after the load write-back signal S11 of the load instruction is broadcasted by the load execution unit 155 is reached), but the micro-instruction is not selected by the instruction dispatch unit 242 and dispatched to the arithmetic and logic unit 251 because it is not ready or for other reasons, even if it is determined that a cache hit occurs, the qualifier 210(i) cannot issue the signal S13 to drive the release circuit 250 for removing the micro-instruction of the entry 241(i) in the reservation station queue 241. Therefore, the logic in the qualifier 210(i) that is configured to accomplish the above operation of determining whether a cache hit occurs should be synchronized with the pipeline of the arithmetic and logic unit 251.

A window checker 230 repeatedly detects the signals S13 generated by the qualifiers 210(0)~210(q). When the signal S13 indicating a load-unconfirmed of the qualifier 210(i) is detected, a signal S17 is issued to drive the arithmetic and logic unit 251 to kill the execution of the micro-instruction of the entry (i), and a signal S16 is issued to drive the scheduler 140 to delete the micro-instruction from the instruction dispatch unit 242 (that is, the instruction dispatch unit 242 will not dispatch this micro-instruction to the arithmetic and logic unit 251 at the next clock cycle). At this time, the micro-instruction of the entry (i) that has been dispatched to the arithmetic and logic unit 251 and the micro-instruction that has been selected by the load execution unit 155 may be referred to as a polluted micro-instruction because the load micro-instruction on which they directly or indirectly depend has not been executed successfully to read the data of the specific memory address through the data cache. It should be noted that the arithmetic and logic unit 251 does not complete the execution of the micro-instruction of the entry (i) and terminates it prematurely, and the qualifier (i) does not issue the signal S13 to drive the release circuit 250 to remove the micro-instruction of the entry 241(i) in the reservation station queue 241. Thus, the micro-instruction of the entry 241(i) in the reservation station queue 241 is retained, thereby avoiding a replay operation. In addition, if the micro-instruction in the load execution unit 155 has not been dispatched to the arithmetic and logic unit 251, the above logic for determining whether a cache hit has occurred will not be triggered, and the micro-instruction of the entry (i) in the reservation station queue 241 will not be removed. For example, it is assumed that entry 241(i) stores the micro-instruction "A3=IADD A1, A2;". When the value of the triggered load-detection counting logic reaches the predetermined value and it found that that the load micro-instruction "A1=LD [Addr1];" is cache hit, the qualifier 210(i) generates the signal S13 indicating the load-confirmed, and the signal S13 is generated to drive the release circuit 250 to remove the micro-instruction of the entry 241 in the reservation station queue 241. When the value of the triggered load-detection counting logic reaches the predetermined value and it is found that the load micro-instruction "A1=LD [Addr1];" is cache miss, the qualifier 210(i) generates the signal S23 indicating the load-unconfirmed. When the window checker 230 detects the signal S23 indicating the load-unconfirmed of the qualifier 210(i), the window checker 230 drives the arithmetic logic unit 251 to kill the execution of the micro-instruction "A3=IADD A1, A2;" of the entry (i) and drives the scheduler 140 to deletes the micro-instruction "B1=IMUL A3, "3";" in the instruction dispatch unit 242 (that is, the instruction dispatch unit 242 will not dispatch the micro-instruction "B1=IMUL A3, "3";" to the arithmetic and logic unit 251 at the next clock cycle). In one embodiment, when it is determined that the aforementioned load-detection counting logic is to be triggered (for example, when the unique identification code of the load micro-instruction contained in the write write-back signal S11 is equal to the unique identification code which the micro-instruction associated with the qualifier 210(i) depends), one of the ready signals of the micro-instruction is set. When the value of the triggered load-detection counting logic reaches the predetermined value and it is found that a cache miss occurs for the load micro-instruction, the qualifier 210(i) further clears the aforementioned ready signal of the micro-instruction of entry in the reservation station queue 241. After a plurality of subsequent clock cycles, when the execution of the load micro-instruction is actually completed, for example, when the load micro-instruction is executed to load the correct data from the level-2 L2 data cache 180 or the main memory, the ready signal is set again.

Furthermore, after the micro-instruction of the entry (i) is dispatched to the arithmetic and logic unit 251, the qualifier 210(i) or the arithmetic and logic unit 251 executing the micro-instruction of the entry (i) broadcasts a write-back signal S43 to other qualifiers, so that the values of the load-detection counting logics of the corresponding second qualifier 210(k) is synchronized with the values of the load-detection counting logics of the first qualifier 210(i). The second qualifier 210(k) is associated with an entry in the reservation station queue 241, and the micro-instruction of the entry contains at least one operand depending on the execution result of the micro-instruction of the entry (i). In an embodiment, the write-back signal S43 contains a unique identification code of the micro-instruction of the entry (i), and a unique identification code on which the micro-instruction associated with the second qualifier 210(k) depends is equal to the unique identifier of the micro-instruction of the entry (i) contained in the write-back signal S43, that is, the second qualifier 210(k) determines that its associated micro-instruction directly depends on the micro-instruction of the entry (i).

Figure 3:
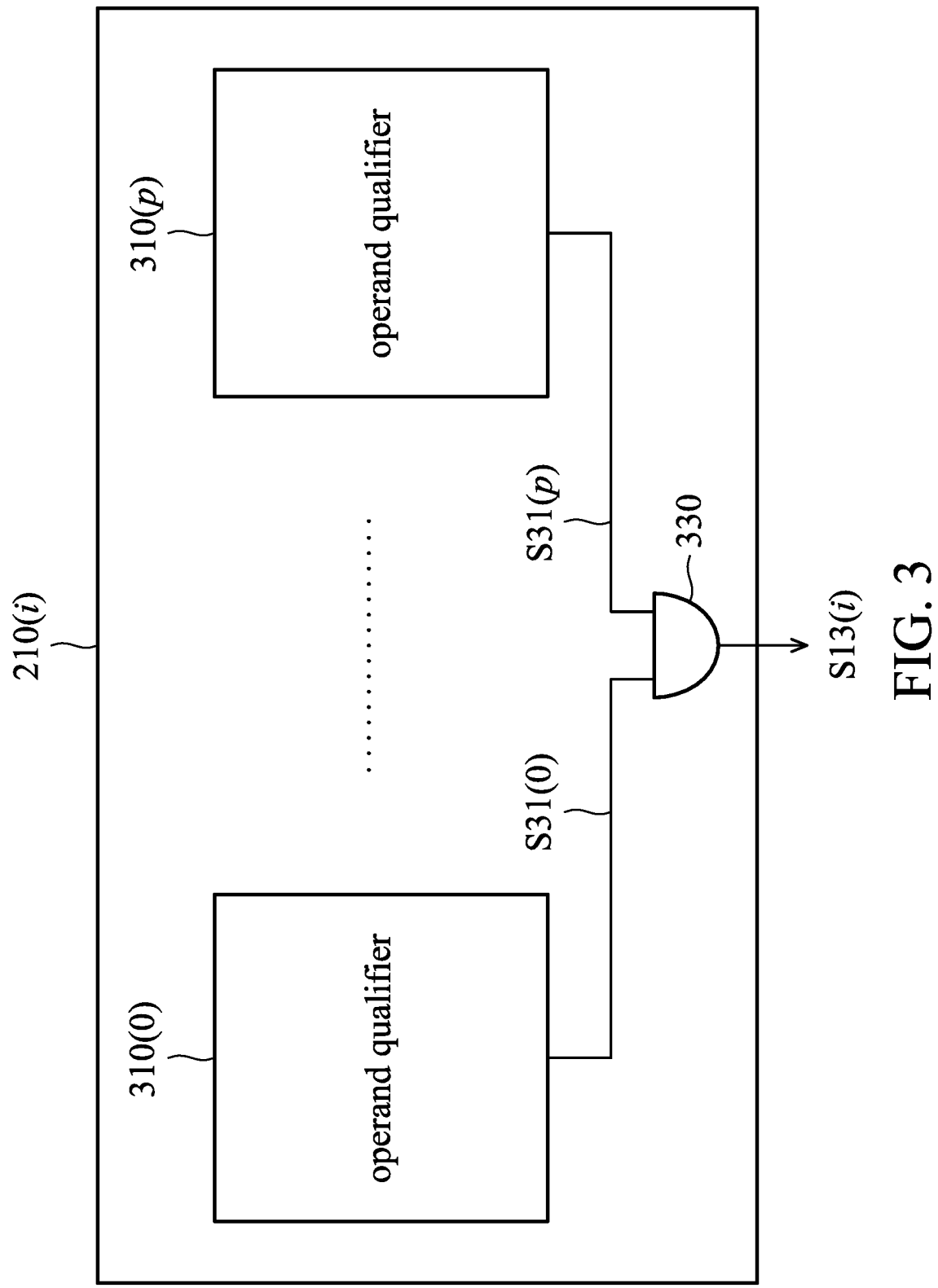
FIG. 3 is a block diagram of a qualifier according to an embodiment of the present invention.

FIG. 3 is a block diagram of a qualifier according to an embodiment of the present invention. The qualifier 210(i) comprises a plurality of operand qualifiers 310(0) through 310(p), where i is an integer between 0 and q. One micro-instruction contains several source operands, and the total number of source operands is p+1, such as 2, 3, 4, and so on. Each operand qualifier 310(j) comprises one of the aforementioned load-detection counting logics. When an corresponding load-detection counting logic is triggered and reaches a predetermined value (for example, a value of 2, indicating that the second clock cycle which occurs after the load write-back signal S11 of the load instruction is broadcasted by the load execution unit 155 is reached), the operand qualifier 310(j) determines whether the execution status of the load micro-instruction on which the corresponding source operand depends directly or indirectly is cache hit or cache miss according to the cache access status signal S12 broadcast by the load execution unit 155. When the cache access status signal S12 indicates a cache hit, a S31(j) indicating a load-confirmed is output; when the data cache access status signal S12 indicates a cache miss, the signal S31(j) indicating a load-unconfirmed is output, where j is an integer between 0 and p. The qualifier 210(i) further comprises an AND gate 330 that is coupled to the signals S31(0)~S31(p) of all of the operand qualifiers 310(0)~(p). An output S31(j) indicates whether the $j^{th}$ source operand is load confirmed, that is, the information indicating whether the depended-on load micro-instruction is cache hit. For example, S31(j)="1" represents the load-confirmed, S31(j)="0" means the load-unconfirmed. If all of the operand qualifiers which trigger the load-detection counting logics output the signals indicating the load-confirmed respectively, the AND gate 330 outputs an all-load-confirmed signal S13(i) indicating an all-load-confirmed to the window checker 230. If any one of the operand qualifiers which trigger the load-detection counting logics output the signals indicating the load-unconfirmed, the AND gate 330 outputs the not-all-load-confirmed signal S13(i) indicating a not-all-load-confirmed to the window checker 230.

Figure 4:
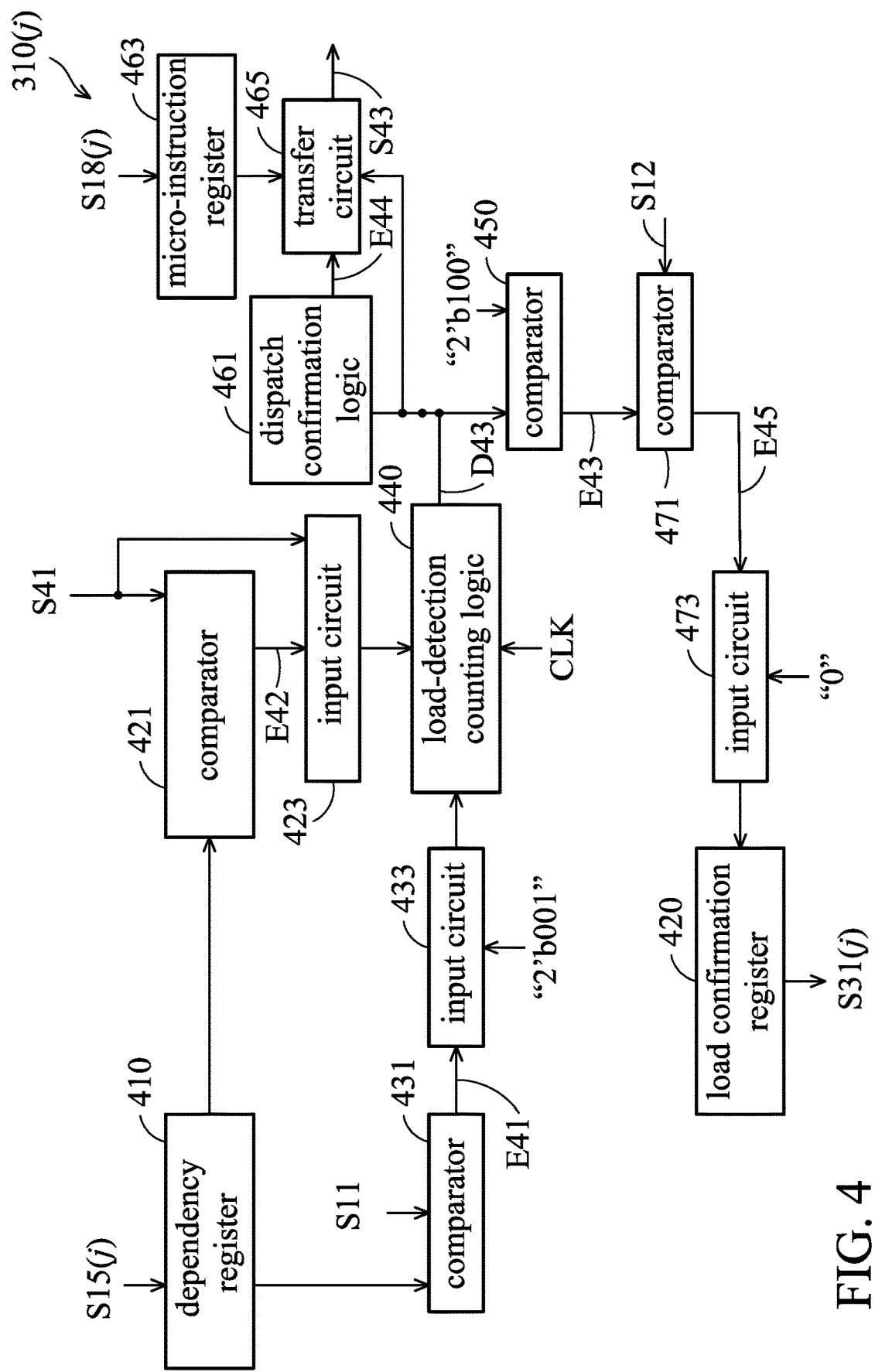
FIG. 4 is a block diagram of an operand qualifier according to an embodiment of the present invention.

FIG. 4 is a block diagram of an operand qualifier according to an embodiment of the present invention. In one aspect, the $j^{th}$ operand of the micro-instruction of entry 141(i) directly depends on the execution result of the load micro-instruction. For example, the operand "A1" of the micro-instruction "A3=IADD A1, A2;" depends on the execution result of the micro-instruction "A1=LD [Addr1];". The operand qualifier 310(j) may determine whether a cache hit or cache miss occurs in the execution of the load micro-instruction on which the $j^{th}$ operand depends when the load-detection counting logic is triggered and its value reaches a predetermined value (such as, as the $n^{th}$ time point). In detail, the operand qualifier 310(j) comprises a load confirmation register 420 for storing the information about whether the $j^{th}$ operand is load confirmed where j is an integer between 0 and p. In a case where it is assumed that the $j^{th}$ operand of the micro-instruction of the corresponding entry does not exist or is not associated with any load micro-instruction, the value of the load confirmation register 420 is initially "1", which indicates that whether the data of the $j^{th}$ operand of the micro-instruction of the corresponding entry is load confirmed. The operand qualifier 310(j) further comprises a dependency register 410 for storing the information of the micro-instruction on which the $j^{th}$ operand of the micro-instruction of the corresponding entry depends, wherein j is an integer between 1 and m. It is worth noted that the information of the micro-instruction on which the operand of the micro-instructions depends is generated by the front end and stored in the dependency register 410. The operand may depend on a load instruction or other types of instructions. The dependency register 410 stores a unique identification code of the micro-instruction on which operand depends, such as reorder buffer indexes (ROBs), physical register file indexes (PRFs), and the like. At $(n-2)^{th}$ clock cycle occurring after a load instruction dispatch unit (not shown in FIG. 1) dispatches a load micro-instruction to the load execution unit 155, the load execution unit 155 broadcasts the load write-back signal S11. The load write-back signal S11 carries the unique identification code of the load micro-instruction. When the operand qualifier 310(j) determines that it is equal to the unique identification code which is stored on the dependency register 410 and which the source operand depends on, a load-detection counting logic 440 is triggered.

The operand qualifier 310(j) comprises a load-detection counting logic 440 that changes the latched value at each clock cycle to allow other components to recognize the current phase status according to, for example, whether the value reaches a predetermined value. The load-detection counting logic 440 may comprise a 3-bit shift register that is cyclically shifted by one bit per clock cycle. A comparator 431 compares the value stored in the dependency register 410 with the unique identification code of the load micro-instruction carried by the load write-back signal S11 at each clock cycle. The load write-back signal S11 is broadcasted by the load execution unit 155 for awaking at least one micro-instruction depending on a particular load micro-instruction, and the load write-back signal S11 carries a unique identification code to identify the particular load micro-instruction. When the two are the same and the counting value carried by the load write-back signal S11 is "2'b000", the comparator 431 outputs an enable signal E41 to an input circuit 433 to the input circuit and drives the input circuit 443 to reset the load-detection counting logic 440 to the value "2'b001" for triggering the load-detection counting logic 440. At each clock cycle, the value of the load-detection counting logic 440 is shifted left by one bit. For example, during the period from the $(n-2)^{th}$ clock cycle to the $n^{th}$ clock cycle, the value D43 of the load-detection counting logic 440 is sequentially changed to "2'b001", "2'b010", and "2'b100". A comparator 450 continues to compare the value D43 of the load-detection counting logic 440 with the predetermined value "2'b100". When the two values are the same, the comparator 450 outputs an enable signal E43 to a comparator 471 and drives the comparator 471 to determine whether the cache access status signal S12 broadcasted by the load execution unit 155 indicates a hit or miss. The hit and the miss can be represented by using different numbers or voltage levels. From the above description, those skilled in the art will appreciate that the load-detection counting logic 440 is used to control the time point for the determination of the comparator 471. Although the load-detection counting logic 440 described in the embodiment may comprise a 3-bit shift register, those skilled in the art may implement the load-detection counting logic 440 by using a 4-bit or 5-bit shift register according to different design requirements for determining whether a cache hit or cache miss occurs in the execution of the depended-on load micro-instruction at the third or fourth clock cycle occurring after the load confirmation process is triggered, however, the present invention is not limited to the above. When the cache access status signal S12 indicates a hit, the comparator 471 outputs a disabled signal E45 to the input circuit 473, and the input circuit 473 drives the load confirmation register 420 to output the signal S31(j) indicating a load-confirmed. When all of the operand qualifiers 310(j) of the source operands of the micro-instruction of the entry 241(i) which trigger the load-detection counting logics 440 output the signals S31(j) indicating the load-confirmed respectively, the qualifier 210 (i) of the micro-instruction of the entry 241(i) outputs the signal S13(i) indicating an all-load-confirmed to drive the release circuit 240 to remove the micro-instruction of the entry 241(i) in the reservation station queue 241, as described above. When the cache access status signal S12 indicates a miss, the comparator 471 outputs the enabled signal E45 to the input circuit 473 and drives the input circuit 473 to reset the load confirmation register 420 to "0". Then, the load confirmation register 420 outputs the signal S31(j) indicating a load-unconfirmed to show that the $j^{th}$ operand of the micro-instruction of the entry 241(i) is load unconfirmed. Once the operand qualifier 310(j) of one source operand of the micro-instruction of the entry 241(i) outputs the signal S31(j) (such as "0") indicating the load-unconfirmed, the qualifier 210(i) of the micro-instruction of the entry 241(i) outputs the signal S13(i) indicating a not-all-load-confirmed to drive the window checker 230. Then, the window checker 230 issues the signal S17 to drive the arithmetic and logic unit 251 to kill the execution of the micro-instruction of the entry (i) or issues the signal S16 to delete the micro-instruction in the instruction dispatch unit 242, as described above.

In another aspect, an operand of another micro-instruction may depend on the execution result of the micro-instruction of the entry 241(i). For example, the operand "A3" of the micro-instruction "B1=IMUL A3, "3";" depends on the execution result of the micro-instruction "A3=IADD A1, A2;". The operand qualifier 310(j) must cooperate with other corresponding qualifier to determine whether a cache hit or cache miss occurs in the execution of the same load micro-instruction at the same preset time point (for example, at the second clock cycle occurring after the load write-back signal S11 of the load instruction is broadcasted by the execution unit 155. In detail, the operand qualifier 310(j) further comprises a micro-instruction register 463 for storing the unique identification code of the micro-instruction of the entry (i). A dispatch confirmation logic 461 confirms whether the micro-instruction of the entry 241(i) has been dispatched to the arithmetic and logic unit 251 by the instruction dispatch unit 242 shown in FIG. 2 for execution. When it is confirmed that the micro-instruction of the entry 241(i) has been dispatched and written back, the dispatch confirmation logic 461 outputs an enable signal E44 to a transfer circuit 465. Then, the transfer circuit 465 generates the write-back signal S43 to carry the unique identification code of the micro-instruction of the entry (i) in the micro-instruction register 463 and the current value D43 of the load-detection counting logic 440, and further broadcasts the write-back signal S43 to other operand qualifiers to the corresponding operand qualifiers the current value D43 of the load-detection counting logic 440.

In another aspect, the $j^{th}$ operand of the micro-instruction of entry 241(i) may depend on the execution result of the load micro-instruction indirectly. For example, the operand "A3" of the micro-instruction "B1=IMUL A3, "3";" depends on the execution result of the micro-instruction "A3=IADD A1, A2;", while the operand "A1" of the micro-instruction "A3=IADD A1, A2;" depends on the execution result of the micro-instruction "A1=LD [Addr1];". The operand qualifier 310(j) may determine whether a cache hit or cache miss occurs in the execution of the indirectly depended-on load micro-instruction when its load-detection counting logic reaches a predetermined value. In detail, the operand qualifier 310(j) receives the write-back signals S41 broadcasted by another operand qualifier or arithmetic logic unit 251 (that is, the write-back signal S43 broadcast by another operand qualifier described above. In the embodiment in which only one micro-instruction is written back at each clock cycle, the write-back signal S41 can be combined with the load write-back signal S11 to form one write-back signal), and the write-back signal S41 contains the unique identification code of another micro-instruction (for example, "A3=IADD A1, A2;") and the counting value of the load-detection counting logic in the operand qualifier of the another micro-instruction. The comparator 421 compares the value of the dependency register 410 and the unique identification code of the micro-instruction that is carried by the write-back signal S41 at each clock cycle. When the two are the same, the comparator 421 outputs the enable signal E42 to an input circuit 423 and drives the input circuit to output the counting value of the load-detection counting logic in the operand qualifier of this another micro-instruction carried by the write-back signal S41 to its load-detection counting logic 440, such as "2'b010". The subsequent operation of the load-detection counting logic 440 may refer to the description of the above paragraphs, and the description will not be repeated for brevity. It should be noted that the cache access status signal S12 broadcasted by the load execution unit 155 does not carry any unique identification code. The present invention ensures that the source operand corresponding to the operand qualifier 310(j) in which the load-detection counting logic 440 reaches the predetermined value "2'b100" must directly or indirectly depend on the load micro-instruction corresponding to the cache access status signal S12 broadcasted by the load execution unit 155.

Table 1 shows the actuation sequence of the micro-instructions in a superscalar microprocessor according to an embodiment:

TABLE 1

| Micro-instruction | $T_0$ | ... | $T_{n-2}$ | $T_{n-1}$ | $T_n$ |
|---|---|---|---|---|---|
| A1 = LD [Addr1]; | X | ... | LD0 | LD1 | LD2 |
| A3 = IADD A1, A2; | | ... | | Disp | EX0 |
| B1 = IMUL A3, "3"; | | ... | | | Disp |
| The value of the first load-detection counting logic | 000 | 000 | 001 | 010 | 100 |
| The value of the second load-detection counting logic | 000 | 000 | 000 | 010 | 100 |

The first load-detection counting logic is associated with the operand "A1" of the micro-instruction "A3=IADD A1, A2;", and the second load-detection counting logic is associated with the operand "A3" of the micro-instruction "B1=IMUL A3, "3";". At the time point $T_0$, the load micro-instruction "A1=LD [Addr1];" is dispatched to the load execution unit 155. At the time point $T_{n-2}$, the load execution unit 155 broadcasts the load write-back signal S11, so that the value of the first load-detection counting logic is set to "2'b001". At the time point $T_{n-1}$, the micro-instruction "A3=IADD A1, A2;" is selected (labeled as "Disp"), the value of the first load-detection counting logic is updated to "2'b010", and the value of the second load-detection counting logic is synchronized with "2'b010". At the time point $T_n$, the micro-instruction "A3=IADD A1, A2;" is dispatched to the arithmetic and logic unit 251 (labeled "EX0"), the micro-instruction "B=IMUL A3, "3";" is selected (labeled as "Disp"), the value of the first load-detection counting logic is updated to "2'b100", and the value of the second load-detection counting logic is synchronized with "2'b100". Since both of the values of the first and second load-detection counting logics reach "2'b100", the qualifiers associated with the micro-instructions "A3=IADD A1, A2;" and "B1=IMUL A3, "3";" must check the cache access status signal S12 broadcast by the load execution unit 155.

Figure 5:
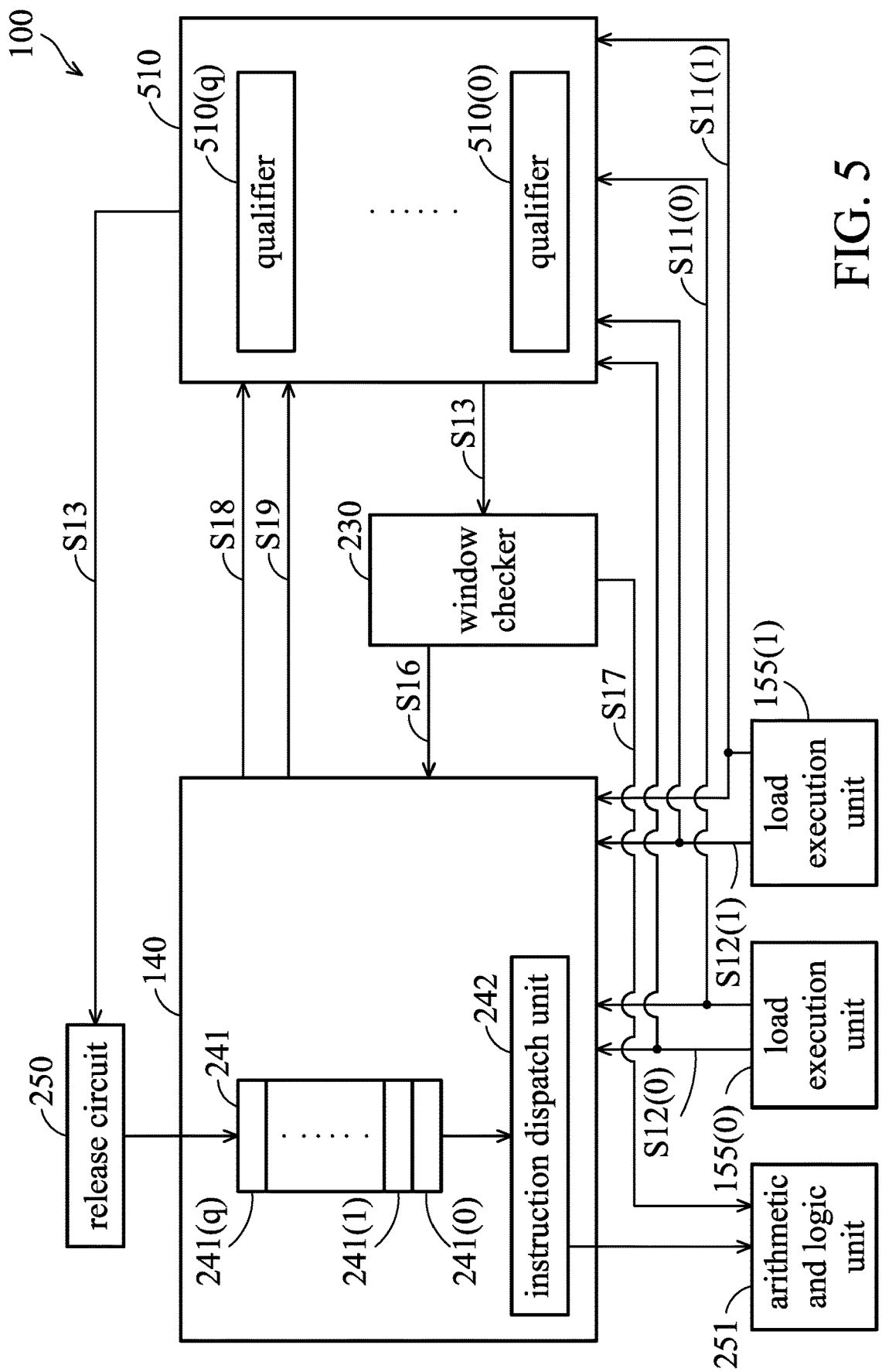
FIG. 5 is a block diagram of a superscalar microprocessor comprising two load execution units according to an embodiment of the present invention.

In some embodiments, to improve the efficiency of data loading, the architecture described in FIG. 2 may be modified to comprise more than two (including two) load execution units. FIG. 5 is a block diagram of a superscalar microprocessor comprising two load execution units according to an embodiment of the present invention. Load execution units 155(0) and 155(1) can execute two load micro-instructions in parallel. Therefore, two source operands of an integer or floating-point arithmetic micro-instruction may come from the results of the load micro-instructions which are executed in parallel, for example:

A1=LD0 [Addr1];
A2=LD1 [Addr2];
A3=IADD A1, A2;
B1=IMUL A3, "3";

wherein, LD0 represents a load micro-instruction executed by the load execution unit 155(0), LD1 represents a load micro-instruction executed by the load execution unit 155(1), IADD represents an integer addition micro-instruction, IMUL represents an integer multiplication micro-instruction, Addr1 and Addr2 represent memory addresses, and A1-A3 and B1 represent specific registers. The load execution unit 155(0) executes the load micro-instruction "A1=LD0 [Addr1];" to obtain data from the memory address Addr1 and store it in the register A1. The load execution unit 155(1) executes the load micro-instruction "A2=LD1 [Addr2];" to obtain data from the memory address Addr2 and store it in the register A2. The scheduler 140 dispatches the load micro-instructions "A1=LD0 [Addr1];" and "A2=LD1 [Addr2];" to the load execution units 155(0) and 155(1) respectively. The technical details of the load execution units 155(0) and the load execution unit 155(1) are similar to the load execution unit 155 and will not be described again for brevity. The arithmetic and logic unit 251 executes the micro-instruction "A3=IADD A1, A2;" to add the value of the register A1 (that is, the data of the memory address Addr1) to the value of the register A2 (that is, the data of the memory address Addr2) and store the operation result in the register A3. Next, the arithmetic and logic unit 251 executes the micro-instruction "B1=IMUL A3, "3";" to multiply the value of the register A3 (that is, the operation result of the IADD micro-instruction) by a constant "3" and store the operation result in the register B1. The operand "A1" of the micro-instruction "A3=IADD A1, A2;" directly depends on both of the load micro-instructions "A1=LD0 [Addr1];" and "A2=LD1 [Addr2];", while the operand "A3" of the micro-instruction "B=IMUL A3, "3";" indirectly depends on both of the load micro-instructions "A1=LD0 [Addr1];" and "A2=LD1 [Addr2];".

The microprocessor may comprise a qualifier collection 510, and the qualifier collection 510 comprises a plurality of qualifiers 510(0)~510(q). Each of the qualifier uniquely corresponds to one entry in the reservation station queue 241 for determining whether the load micro-instruction on which the micro-instruction in the entry depends (directly or indirectly) is ready. Each micro-instruction may contain a plurality of operands directly depending on the execution results of the load micro-instructions or a plurality of operands indirectly depending on the execution results of the load micro-instructions, for example, the operand "A1" of the micro-instruction "A3=IADD A1, A2;" depends on the execution result of the load micro-instruction "A1=LD0 [Addr1];", and the operand "A1" thereof depends on the execution result of the load micro-instruction "A2=LD1 [Addr2];".

At the $(n-2)^{th}$ clock cycle occurring after the load instruction dispatch unit (not shown in FIG. 5) dispatches two load micro-instructions the load execution units 155(0) and 155(1) respectively, the load execution unit 155(0) broadcasts a load write-back signal S11(0) to all of qualifiers 510(0)~510(q) and the scheduler 140, while the load execution unit 155(1) broadcasts a load write-back signal S11(1) to all of qualifiers 510(0)~510(q) and the scheduler 140, wherein the purpose of the load write-back signals S11(0) and S11(1) are to inform that all operands in the scheduler 140 which depend on the two load micro-instructions are ready. The load write-back signals S11(0) and S11(1) carry the unique identifiers of the two load micro-instructions. In theory, the scheduler 140 receives the load write-back signals S11(0) and S11(1) at the $(n-2)^{th}$ clock cycle, and, then, the instruction dispatch unit 242 selects a micro-instruction that depends on the execution results of the two load micro-instructions from the reservation station queue 241. For example, the scheduler 140 sets the operands of the micro-instruction that depends on the two load micro-instructions to be ready according to the load write-back signals S11(0) and S11(1). If all of the operands of the micro-instruction are ready at the $n^{th}$ clock cycle, the instruction dispatch unit 242 may select the micro-instruction, dispatch the selected micro-instruction to the arithmetic and logic unit 251, and select a micro-instruction that depends on the execution result of the dispatched micro-instructions from the reservation station queue 241. For example, at the $(n-2)^{th}$ clock cycle, the scheduler 140 receives the load write-back signal S11(0), which contains the unique identifier of the first load micro-instruction "A1=LD0 [Addr1]" and the load write-back signal S11(1), which contains the unique identifier of the second load micro-instruction "A2=LD1 [Addr2]". If the qualifier of the micro-instruction "A3=IADD A1, A2;" determines that the unique identification codes on which its two operands depend are equal to the unique identification codes contained in the load write-back signals S11(0) and S11(1), the instruction dispatch unit 242 selects the ready micro-instruction "A3=IADD A1, A2;" from the reservation station queue 241 at the $(n-1)^{th}$ clock cycle, dispatches the micro-instruction "A3=IADD A1, A2;" to the arithmetic and logic unit 251 at the $n^{th}$ clock cycle, and selects the micro-instruction "B1=IMUL A3, "3";" from the reservation station queue 241 (because all the operands of the micro-instruction "B=IMUL A3, "3";" are ready at the n$^{th}$ clock cycle).

When each of the qualifiers 510(0)~510(q) receives the load write-back signal S11(0), it determines whether the unique identification code on which its operands depend is equal to the unique identifier of the load instruction contained in the load write-back signal S11(0), that is, it determines whether one of the source operands of the micro-instruction of the corresponding entry depends on the execution result of the first load micro-instruction. If so, a load-detection counting logic is triggered. When each of the qualifiers 510(0)~510(q) receives the load write-back signal S11(1), it determines whether the unique identification code on which its operands depend is equal to the unique identifier of the load instruction contained in the load write-back signal S11(1), that is, it determines whether one of the source operands of the micro-instruction of the corresponding entry depends on the execution result of the second load micro-instruction. If so, a load-detection counting logic is triggered, too. When the value of the triggered load-detection counting logic reaches a predetermined value (for example, a value of 2, indicating that the second clock cycle which occurs after the load write-back signals S11 of the load instructions are broadcasted by the load execution unit 155 is reached), and the micro-instruction associated with the qualifier 210(i) has been dispatched to the arithmetic and logic unit 251 for execution (e.g., at the (n−1)$^{th}$ clock cycle, the micro-instruction is selected from the reservation station queue 241 by the instruction dispatch unit 242 and dispatched to the arithmetic and logic unit 251 for execution). When a cache hit is found for both of the load micro-instructions which need to be confirmed through cache access status signals S12(0) and S12(1) broadcasted by the load execution units 155(0) and 155(1), the qualifiers 510(i) generates a signal S13 indicating a load-confirmed to drive a release circuit 250 to remove micro-instruction of the entry 241(i) in the reservation station queue 241, where i is an integer between 0 and q. When a cache miss is found for one of the load micro-instructions which need to be confirmed through the cache access status signals S12(0) and S12(1) broadcasted by the load execution units 155(0) and 155(1), the qualifiers 510(i) generates the signal S13 indicating a load-unconfirmed.

Figure 6:
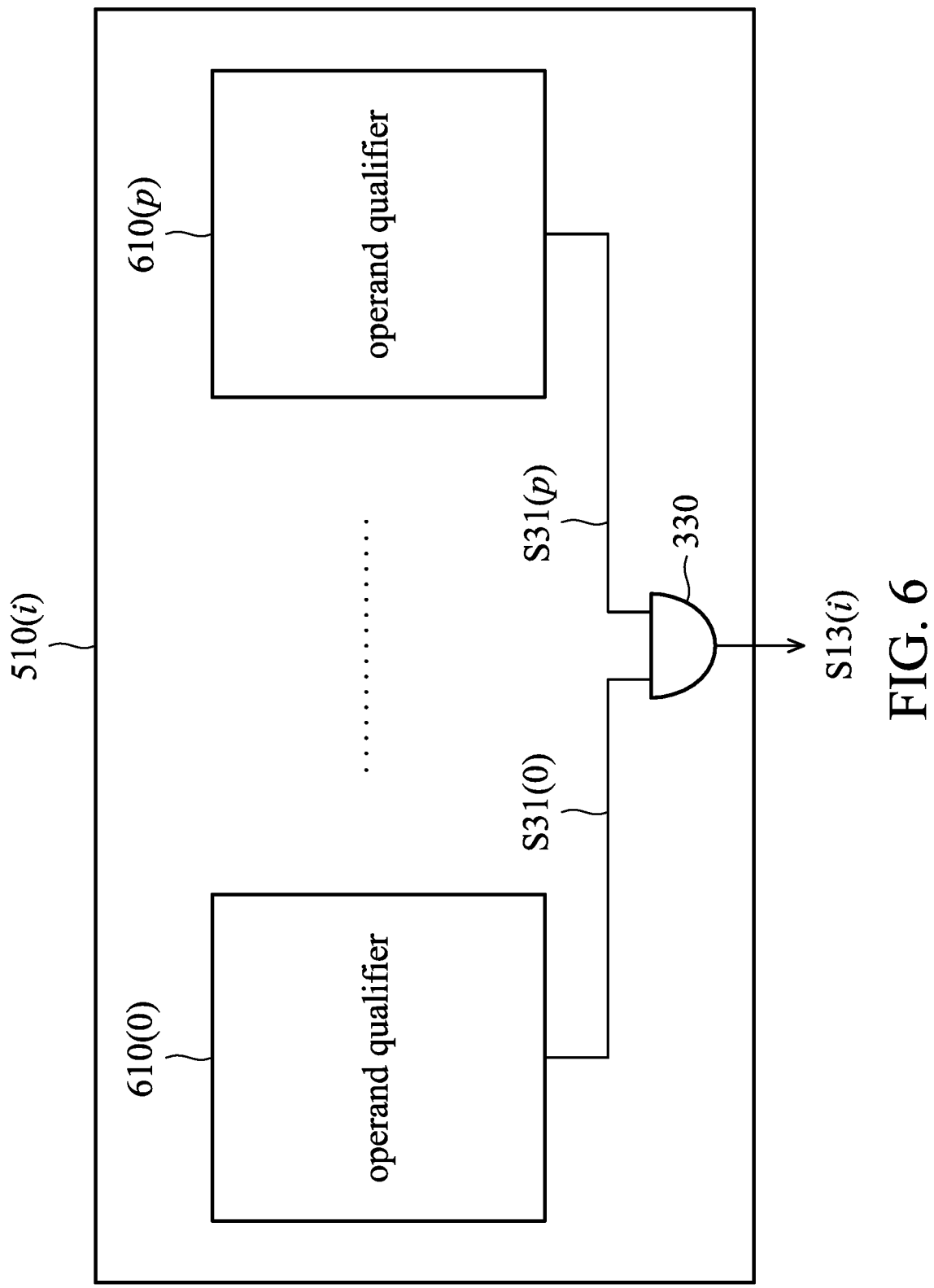
FIG. 6 is a block diagram of a qualifier according to an embodiment of the present invention.

FIG. 6 is a block diagram of a qualifier according to an embodiment of the present invention. The qualifier 510(i) comprises a plurality of operand qualifiers 610(0) through 610(p), where i is an integer between 0 and q. One micro-instruction contains several source operands, and the total number of source operands is p+1, such as 2, 3, 4, and so on. Assume that the 0$^{th}$ operand of the entry 241(i) depends on the load micro-instruction executed by load execution unit 155(0), and the first operand of the entry 241(i) depends on the load micro-instruction executed by the load execution unit 155(1). If all of the operand qualifiers 610(0)~610(p) in the qualifier 510(i) that trigger the load-detection counting logics outputs signals indicating a load-confirmed, the gate 330 outputs a signal S13(i) indicating an all-load-confirmed to the window checker 230. If any one of the operand qualifiers which trigger the load-detection counting logics output a signal indicating a load-unconfirmed (for example, the operand qualifier 610(0) or/and the operand qualifier 610(1) output a signal indicating the load-unconfirmed), the AND gate 330 outputs a signal S13(i) indicating a not-all-load-confirmed to the window checker 230.

Each operand qualifier 310(j) comprises one of the aforementioned load-detection counting logics. When an corresponding load-detection counting logic is triggered and reaches a predetermined value (for example, a value of 2, indicating that the second clock cycle which occurs after the load write-back signal S11 of the load instruction is broadcasted by the load execution unit 155 is reached), the operand qualifier 310(j) determines whether the execution status of the load micro-instruction on which the corresponding source operand depends directly or indirectly is cache hit or cache miss according to the cache access status signal S12 broadcast by the load execution unit 155. When the cache access status signal S12 indicates a cache hit, a S31(j) indicating a load-confirmed is output; when the data cache access status signal S12 indicates a cache miss, the signal S31(j) indicating a load-unconfirmed is output, where j is an integer between 0 and p. The qualifier 210(i) further comprises an AND gate 330 that is coupled to the signals S31(0)~S31(p) of all of the operand qualifiers 310(0)~(p). An output S31(j) indicates whether the j$^{th}$ source operand is load confirmed, that is, the information indicating whether the depended-on load micro-instruction is cache hit. For example, S31(j)="1" represents the load-confirmed, S31(j)="0" means the load-unconfirmed. If all of the operand qualifiers which trigger the load-detection counting logics output the signals indicating the load-confirmed respectively, the AND gate 330 outputs a signal S13(i) indicating an all-load-confirmed to the window checker 230. If any one of the operand qualifiers which trigger the load-detection counting logics output a signal indicating the load-unconfirmed, the AND gate 330 outputs a signal S13(i) indicating a not-all-load-confirmed to the window checker 230.

Figure 7:
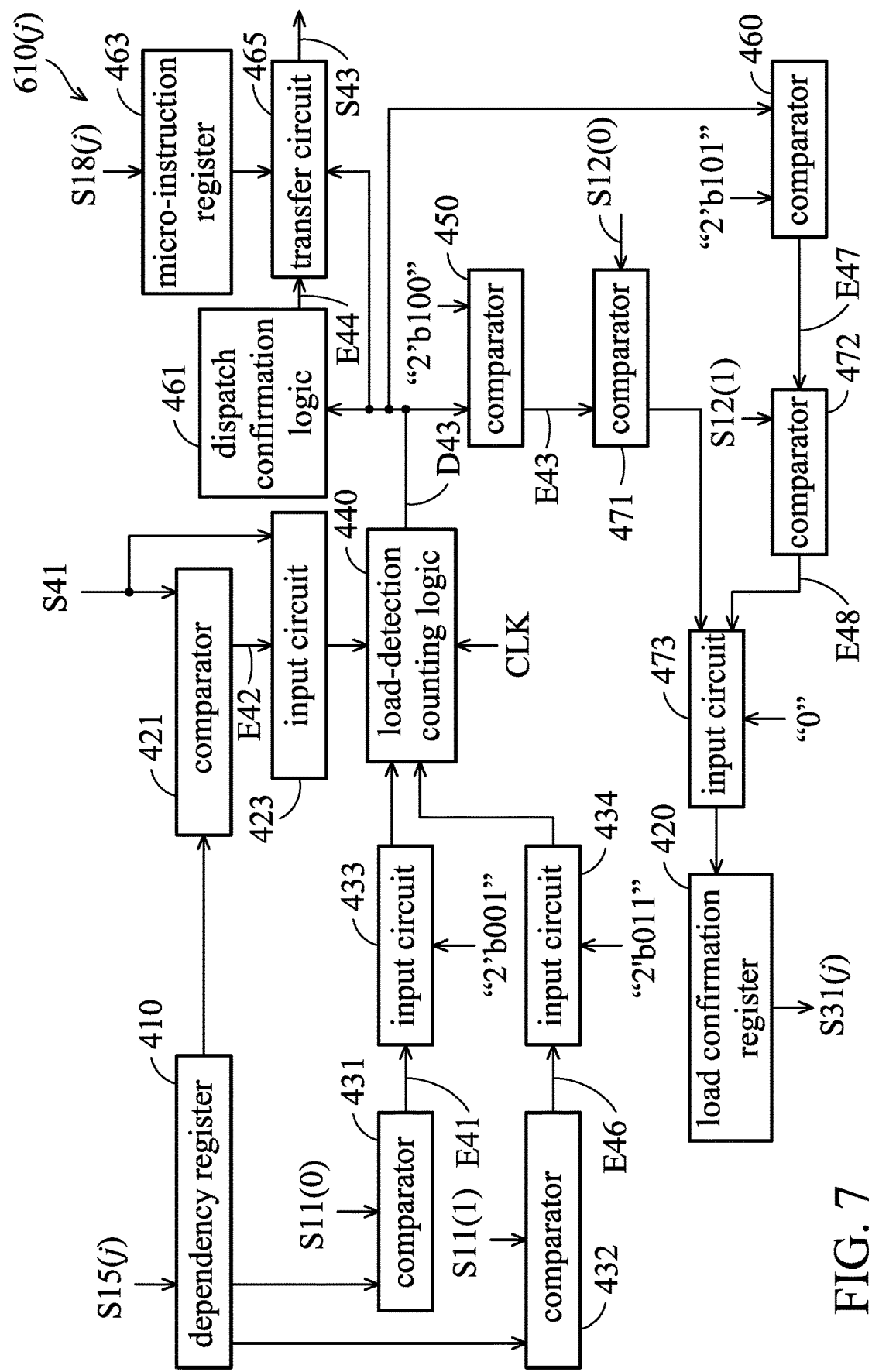
FIG. 7 is a block diagram of an operand qualifier for two load execution units according to an embodiment of the present invention.

FIG. 7 is a block diagram of an operand qualifier for two load execution units according to an embodiment of the present invention. When the j$^{th}$ operand of a micro-instruction of a corresponding entry depends on the load micro-instruction executed by the load execution unit 155(0) or 155(1), the comparator 431 compares the value stored in the dependency register 410 (that is the information of the micro-instruction on which the j$^{th}$ operand of the micro-instruction of the corresponding entry depends) with the unique identification code of the load micro-instruction carried by the load write-back signal S11(0) at each clock cycle. The load write-back signal S11(0) is used by the load execution unit 155(0) to awake at least one micro-instruction depending on the load micro-instruction executed by it. When the two are the same and it is determined that the counting value carried by the load write-back signal S11(0) is "2'b000", the comparator 431 resets the load-detection counting logic 440 to the value "2'b001" for triggering the load-detection counting logic 440. Moreover, the comparator 432 compares the value stored in the dependency register 410 with the unique identification code of the load micro-instruction carried by the load write-back signal S11(1) at each clock cycle. The load write-back signal S11(1) is used by the load execution unit 155(1) to awake at least one micro-instruction depending on the load micro-instruction executed by it. When the two are the same and the counting value carried by the load write-back signal S11(1) is "2'b000", the comparator 432 resets the load-detection counting logic 440 to the value "2'b011" for triggering the load-detection counting logic 440. The different initial values "2'b001" and "2'b011" are used to allow subsequent components to recognize whether the cache access status signal S12(0)/S12(1) broadcast by the load execution unit 155(0) or the load execution unit 155(1) should be monitored at the decision time point The case in which the load-detection counting logic 440 is reset by the comparator

431 indicates that resetting the load-detection counting logic 440 to the value "2'b001" is induced by the load write-back signal S11(0) written back by the load execution unit 155(0). The case in which the load-detection counting logic 440 is reset by the comparator 432 indicates that resetting the load-detection counting logic 440 to the value "2'b011" is induced by the load write-back signal S11(1) written back by the load execution unit 155(1).

The comparator 450 continues to compare the value D43 of the load-detection counting logic 440 with the predetermined value "2'b100". When the two values are the same, the comparator 450 outputs an enable signal E43 to the comparator 471 and drives the comparator 471 to determine whether the cache access status signal S12(0) broadcasted by the load execution unit 155(0) indicates a hit or miss. When the cache access status signal S12(0) indicates a miss, the comparator 471 drives the input circuit 473 to reset the load confirmation register 420 to "0", which indicates that the data of the $j^{th}$ operand of the micro-instruction of the entry 241(i) is load confirmed The comparator 460 continues to compare the value D43 of the load-detection counting logic 440 with the predetermined value "2'b101". When the two values are the same, the comparator 460 outputs an enable signal E47 to the comparator 472 and drives the comparator 472 to determine whether the cache access status signal S12(1) broadcasted by the load execution unit 155(1) indicates a hit or miss. When the cache access status signal S12(1) indicates a miss, the comparator 472 drives the input circuit 473 to reset the load confirmation register 420 to "0", which indicates that the data of the $j^{th}$ operand of the micro-instruction of the entry 241(i) is load confirmed. The detailed operations of other components in FIG. may refer to the related description of FIG. 4, and the related description will not be repeated here for brevity.

Table 2 shows the actuation sequence of the micro-instructions in a superscalar microprocessor according to another embodiment:

TABLE 2

| Micro-instruction | $T_0$ | ... | $T_{n-2}$ | $T_{n-1}$ | $T_n$ |
|---|---|---|---|---|---|
| A1 = LD0 [Addr1]; | X | ... | LD0 | LD1 | LD2 |
| A2 = LD1 [Addr2]; | X | ... | LD0 | LD1 | LD2 |
| A3 = IADD A1, A2; | | ... | | Disp | EX0 |
| The value of the first load-detection counting logic | 000 | ... | 001 | 010 | 100 |
| The value of the second load-detection counting logic | 000 | ... | 011 | 110 | 101 |

The first load-detection counting logic is associated with the operand "A1" of the micro-instruction "A3=IADD A1, A2;", and the second load-detection counting logic is associated with the operand "A2" of the micro-instruction "A3=IADD A1, A2;". At the time point $T_0$, the load micro-instruction "A1=LD0 [Addr1];" is dispatched to the load execution unit 155(0), and the load micro-instruction "A2=LD1 [Addr2];" is dispatched to the load execution unit 155(1), simultaneously. At the time point $T_{n-2}$, the load execution unit 155(0) broadcasts the load write-back signal S11(0), so that the value of the first load-detection counting logic is set to "2'b001"; the load execution unit 155(1) broadcasts the load write-back signal S11(1), so that the value of the second load-detection counting logic is set to "2'b011". At the time point $T_{n-1}$, the micro-instruction "A3=IADD A1, A2;" is selected (labeled as "Disp"), the value of the first load-detection counting logic associated with "A1" is updated to "2'b010", and the value of the second load-detection counting logic associated with "A2" is updated to "2'b110". At the time point $T_n$, the micro-instruction "A3=IADD A1, A2;" is dispatched to the arithmetic and logic unit 251 (labeled "EX0"), the value of the first load-detection counting logic is updated to "2'b100", and the value of the second load-detection counting logic is updated to "2'b101". Since the values of the first and second load-detection counting logics reach "2'b100" and "2'b101" respectively, the qualifiers associated with the operands "A1" and "A2" of the micro-instruction "A3=IADD A1, A2;" must check the cache access status signals S12(0) and S12(1) broadcast by the load execution units 155(0) and 155(1), respectively.

In some embodiments, those skilled in the art can modify the operand qualifier 610(j) shown in FIG. 7 to determine whether the data loading of the source operand indirectly depending on two load micro-instructions is confirmed. The operation of the operand qualifier 610(j) of the operand "A3" in the micro-instruction "B1=IMUL A3, "3";" depending on the micro-instruction "A3=IADD A1, A2" is further described below. The qualifier 510(i) of the micro-instruction "A3=IADD A1, A2" further comprises a comparator (not shown in FIG. 6) which operates with the operand qualifier 610(j) of the operand "A1" and the operand qualifier 610(j+1) of the operand "A2". The comparator compares the value latched by the load-detection counting logic (that is the first load-detection counting logic in Table 2) of the operand qualifier 610(j) of the operand "A1" with a first predetermined value "2'b010" and compares the value latched by the load-detection counting logic (that is the second load-detection counting logic in Table 2) of the operand qualifier 610(j+1) of the operand "A2" with a second predetermined value "2'b110". When the first and second load-detection counting logics respectively reach the predetermined values "2'b010" and "2'b110" at the same time, a synchronization counting value is set to a fifth predetermined value "2'b111". When the qualifier 510(i) of the micro-instruction "A3=IADD A1, A2" confirms that the micro-instruction "A3=IADD A1, A2" has been dispatched and written back, the qualifier 510(i) generates a write-back signal S43 which carries the unique identification code of the micro-instruction "A3=IADD A1, A2" and the synchronization counting value "2'b111" and broadcasts the write-back signal S43 to the operand qualifiers of the other micro-instructions.

When the operand qualifier 610(j) of the operand "A3" of the micro-instruction "B=IMUL A3, "3";" depending on the micro-instruction "A3=IADD A1, A2" receives the aforementioned write-back signal S43 (for example, corresponding to the write-back signal S41 of FIG. 4), the operand qualifier 610(j) synchronizes the value of its own load-detection counting logic 440 with the fifth predetermined value "2'b111". When the value of the load-detection counting logic 440 is "2'b111", the operand qualifier 610(j) of the operand "A3" needs to simultaneously determine the cache access status signal S12(0) broadcasted by the first load execution unit 155(0) and the cache access status signal S12(1) broadcasted by the second load execution unit 155(1). Only when both of the first and second cache access status signals S12(0) and S12(1) indicate a hit, the signal S31(j) indicating a load-confirmed is output as "1" to indicate that the operand "A3" of the micro-instruction is load confirmed. Once one of the first and second cache access status signals S12(0) and S12(1) indicates a hit, the load confirmation register 420 is reset to "0" to output a signal S31(j) indicating a load-unconfirmed is output as "1" to indicate that the operand "A3" of the micro-instruction is load unconfirmed.

It is worth noted that in the embodiment of FIG. 5 where there are two load execution units 155(0) and 155(1), the block diagram of the operand qualifier 610(j) shown in FIG. 7 is only an example, and the present invention is not limited thereto. In other embodiments, the operand qualifier 610(j) of FIG. 7 may further comprise two load-detection counting logics 440 for detecting the execution conditions (for example, hit/miss) of the load instructions executed by the two load execution units 155(0) and 155(1). The load-detection counting logic 440 of the operand qualifier 610(j) of the FIG. 7 adopts a relatively smart counting manner: the load execution unit 155(0) corresponds to the counting value "2'b000", "2' B001", "2'b010", and "2'b100", and the load execution unit 155(1) corresponds to the counting values "2'b000", "2'b011", "2'b110", and "2'b101". Thus, only one load-detection counting logic 440 is sufficient to show the execution stages of the load instructions executed by the two load execution units 155(0) and 155(1), which saves circuitry area for one load-detection counting logic.

Figure 8:
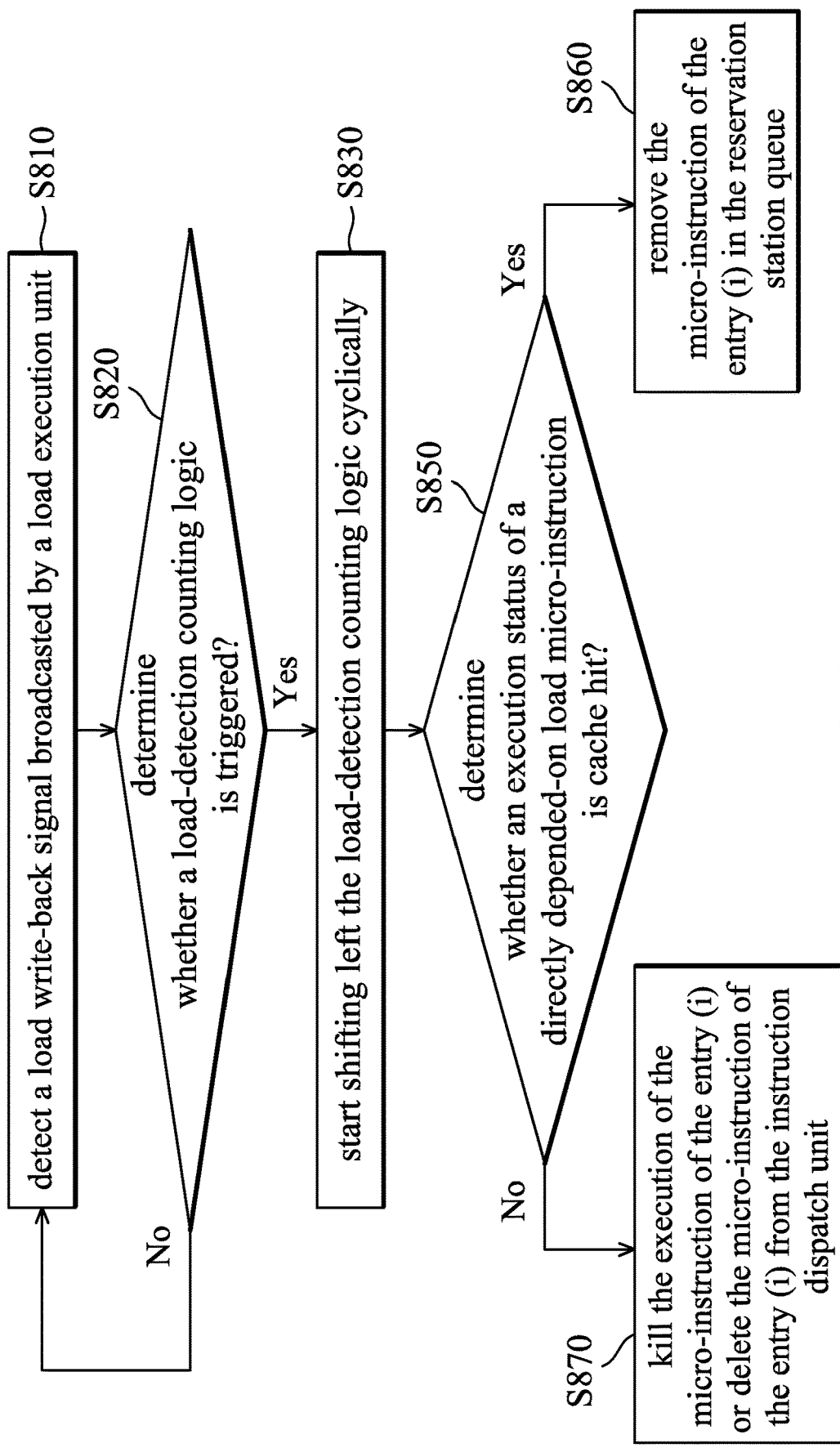
FIG. 8 is a flow chart of a micro-instruction scheduling method according to an embodiment of the present invention.

FIG. 8 is a flow chart of a micro-instruction scheduling method according to an embodiment of the present invention. This method is executed by the qualifier 210(i) or 510(i) for scheduling an operation micro-instruction directly depending on a load micro-instruction according to on the execution status of the load micro-instruction. The qualifier 210(i) or 510(i) detects the load write-back signal S11, S11(0) or S11(1) broadcasted by the load execution unit 155, 155(0) or 155(1) every clock cycle (Step S810) and determines whether the load-detection counting logic 440 is triggered according to the contents of the load write-back signal S11, S11(0) or S11(1) (Step S820). On the other hand, Step S820 is performed to determine whether the load execution unit 155, 155(0) or 155(1) wakes up the micro-instruction of the entry (i). In detail, each of the operand qualifiers 310(0)~310(p) of the qualifier 210(i) determines whether the load write-signal S11 contains the value stored in the dependency register 410, or each of the operand qualifier 610(0)~610(p) of the qualifier 510(i) determines whether the load write-back signal S11(0) or S11(1) contains the value stored in the dependent register 410. Step S820 can be accomplished through the comparator 431 or 432. When it is determined that the load-detection counting logic 440 is triggered (the "YES" path from Step S820), the load-detection counting logic 440 starts being shifted left (step S830). In other embodiments, for Step S830, the load-detection counting logic 440 can perform counting by other means (for example, the counting value is incremented by one every clock cycle), however, the present invention is not limited thereto. Then, when the triggered load-detection counting logic 440 reaches a predetermined value (for example, the load-detection counting logic is shifted left from "2'b001" to the predetermined value "2'b100" or from "2'b011" to the predetermined value "2'b101", cyclically), it is determined whether the execution status of the directly depended-on load micro-instruction is cache hit (step S850). In Step S850, whether the determination time point is reached can be determined by determining whether the value of the load-detection counting logic 440 reaches the predetermined value. Step S850 may be accomplished through the comparator 450 in an operand qualifier of the qualifier 210(i) or through comparator 450 in one operand qualifier of the qualifier 510(i) or/and the comparator 460 in another operand qualifier thereof. When the execution status of the directly depended-on load micro-instruction is cache hit and the micro-instruction has been dispatched to the arithmetic and logic unit 251 for execution (the "YES" path from Step S850), the micro-instruction of the entry 241(i) in the reservation station queue 241 is removed (Step S860). Step S860 can be accomplished by driving the release circuit 250. When the execution status of the directly depended-on load micro-instruction is cache miss and the micro-instruction has been dispatched to the arithmetic and logic unit 251 for execution (the "No" path from Step S850), the execution of the micro-instruction of the entry (i) is killed, or the micro-instruction of the entry (i) is deleted from the instruction dispatch unit 242 (step S870). Step S870 can be accomplished by driving the arithmetic and logic unit 251. It should be noted here that when the execution status of the depended-on load micro-instruction is cache miss, the micro-instruction of the entry (i) may not have been selected and dispatched from the instruction dispatch unit 242. Thus, in this case, the killing or deleting in Step S870 is not performed, however, the present invention is not limited thereto.

Figure 9:
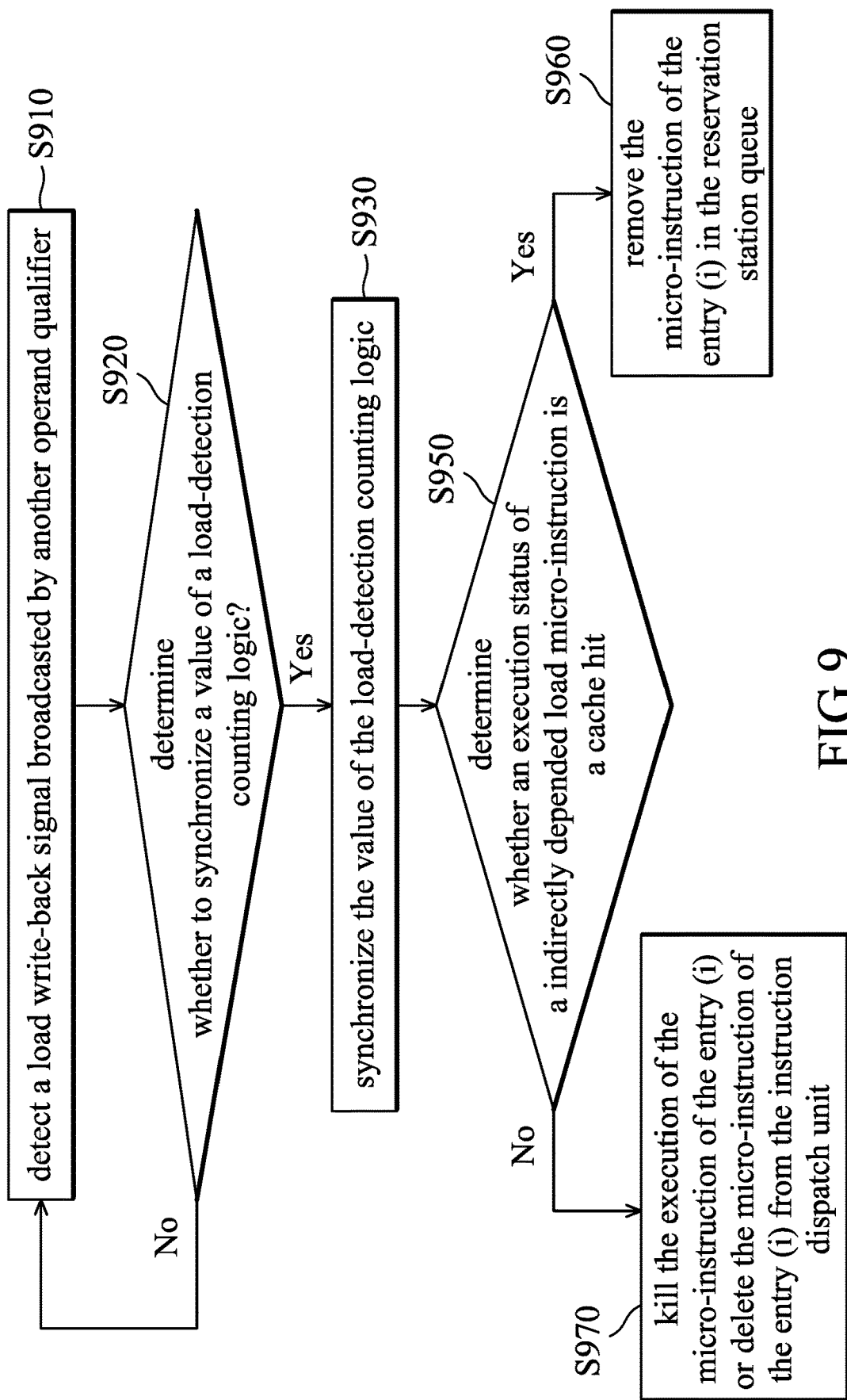
FIG. 9 is a flow chart of a micro-instruction scheduling method according to an embodiment of the present invention.

FIG. 9 is a flow chart of a micro-instruction scheduling method according to an embodiment of the present invention. This method is executed by the qualifier 210(i) or 510(i) for scheduling an operation micro-instruction indirectly depending on a load micro-instruction according to on the execution status of the load micro-instruction. The qualifier 210(i) or 510(i) (associated with the first micro-instruction) detects the write-back signal S41 broadcasted by the operand qualifier of another micro-instruction (such as the second micro-instruction) every clock cycle (Step S910) and determines whether the value of the load-detection counting logic according to the content of the write-back signal S41 is to be synchronized (step S920), that is, whether the value of its first load-detection counting logic is to be set to a value, carried by the write-back signal S41, of a second load-detection counting logic of the operand qualifier of the second micro-instruction broadcasting the write-back signal S41. In detail, each of the operand qualifiers 310(0)~310(p) of the qualifier 210(i) or each of the operand pass checkers 610(0)~610(p) of the qualifier 510(i) determines whether the unique identification code of the second micro-instruction contained in the write-back signal S41 is equal to the unique identification code stored in the dependency register 410. Step S920 can be accomplished by the comparator 421. When it is determined that the value of the load-detection counting logic is to be synchronized (the "YES" path from Step S920), the value of the load-detection counting logic 440 is set to the value of the second load-detection counting logic of the operand qualifier of the second micro-instruction related to the write-back signal S41. In other embodiments, for Step S930, the load-detection counting logic 440 can perform counting by other means (for example, the synchronized value is incremented by one after every clock cycle), however, the present invention is not limited thereto. Then, the synchronized value of the first load-detection counting logic 440 reaches a predetermined value (for example, the load-detection counting logic is shifted left from "2'b010" to the predetermined value "2'b100" or from "2'b110" to the predetermined value "2'b101", cyclically), it is determined whether the execution statuses of all of the indirectly depended-on load micro-instructions are cache hit (step S950). In Step S950, whether the determination time point is reached can be determined by determining whether the value of the load-detection counting logic 440 reaches the predetermined value. Step S950 may be accomplished through the comparator 450 in an operand qualifier of the qualifier 210(i) or through comparator 450 in one operand qualifier of the qualifier 510(i) or/and the comparator 460 in another operand qualifier thereof. When the execution statuses of all of the indirectly depended-on load micro-instructions are cache hit and the first micro-instruction has been dispatched to the arithmetic and logic unit 251 for execution ("YES" path in step S950), the micro-instruction of the entry (i) 241 in the reservation station queue 241 is removed (step S960). Step S960 can be accomplished by driving the release circuit 250. When the execution status of any one of the depended-on load micro-instructions is cache miss and the first micro-instruction has been dispatched to the arithmetic and logic unit 251 for execution (the "No" path from Step S950), the arithmetic and logic unit 251 kills the execution of the first micro-instruction, or the micro-instruction of the entry (i) is deleted from the instruction dispatch unit 242 (step S970). It should be noted here that when the execution status of any one of the depended-on load micro-instructions is cache miss, the first micro-instruction of the entry (i) may not have been selected by the instruction dispatch unit 242. Thus, in this case, a deleting operation is not performed in Step S970, however, the present invention is not limited thereto.

Although FIGS. 1-7 comprise the above-described elements, more other additional elements can be used without departing from the spirit of the invention to achieve a better technical effect. Further, the processing steps in FIGS. 8 and 9 are performed in a specific order, however, those skilled in the art can modify the order of these steps for achieve the same effect without departing from the spirit of the invention. Thus, the invention is not limited to the order as described above.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for scheduling micro-instructions, performed by a first qualifier, wherein the first qualifier is associated with a first micro-instruction, the first micro-instruction depends on a second micro-instruction, and the second micro-instruction depends on one or a plurality of load micro-instructions executed by one or a plurality of load execution units, the method comprising:
   detecting a write-back signal broadcasted by a second qualifier associated with the second micro-instruction;
   determining whether a value of a first load-detection counting logic is to be synchronized with a value of a second load-detection counting logic carried by the write-back signal according to content of the write-back signal;
   determining whether execution statuses of all of the load micro-instructions are cache hit when the synchronized value of the first load-detection counting logic reaches a predetermined value; and
   driving a release circuit to remove the first micro-instruction in a reservation station queue when the execution statuses of all of the load micro-instructions are cache hit and the first micro-instruction has been dispatched to an arithmetic and logic unit for execution.

2. The method for scheduling micro-instructions as claimed in claim 1, further comprising:
   driving the arithmetic and logic unit to kill execution of the first micro-instruction when the execution status of any one of the load micro-instructions is cache miss.

3. The method for scheduling micro-instructions as claimed in claim 1, wherein when the execution status of any one of the load micro-instructions is cache miss, the first micro-instruction in the reservation station queue is retained from being removed.

4. The method for scheduling micro-instructions as claimed in claim 1, wherein when it is determined that the value of the first load-detection counting logic is to be synchronized, a ready signal of one operand of the first micro-instruction is set, and after the ready signals of all the operands of the first micro-instruction are set, the first micro-instruction is dispatched to the arithmetic and logic unit for execution.

5. The method for scheduling micro-instructions as claimed in claim 4, wherein when the execution status of any one of the load micro-instructions is cache miss, the ready signal of the first micro-instruction is cleared, and when execution of the one or plurality of load micro-instructions is completed, the ready signal is set again.

6. The method for scheduling micro-instructions as claimed in claim 1, further comprising:
   determining that the value of the first load-detection counting logic is to be synchronized with the value of the second load-detection counting logic carried by the write-back signal when a unique identification code of the second micro-instruction contained in the write-back signal is equal to a unique identification code on which the first micro-instruction depends.

7. A scheduler device for micro-instructions comprising:
   a reservation station queue; a release circuit coupled to the reservation station queue; and
   a first qualifier, coupled to the release circuit, detecting a write-back signal broadcasted by a second qualifier, determining whether a value of a first load-detection counting logic is to be synchronized with a value of a second load-detection counting logic carried by the write-back signal according to content of the write-back signal, determining whether execution statuses of all of the load micro-instructions are cache hit when the synchronized value of the first load-detection counting logic reaches a first predetermined value, and driving the release circuit to remove the first micro-instruction in the reservation station queue when the execution statuses of all of the load micro-instructions are cache hit and the first micro-instruction has been dispatched to an arithmetic and logic unit for execution,
   wherein the first qualifier is associated with the first micro-instruction, the first micro-instruction depends on a second micro-instruction, and the second micro-instruction depends on one or a plurality of load micro-instructions executed by one or a plurality of load execution units.

8. The scheduler device as claimed in claim 7, wherein the first qualifier comprises:
   a plurality of operand qualifiers, each operand qualifier associated with one of a plurality of operands of the first micro-instruction, and each operand qualifier comprising one load-detection counting logic, wherein when the synchronized value of the first load-detection counting logic reaches the first predetermined value, the corresponding operand qualifier determines whether the execution status of the load micro-instruction on which the corresponding operand directly depends is cache hit or cache miss according to a cache access status signal broadcasted by one load execution unit, and when the execution status of the load micro-instruction is cache hit, the corresponding operand qualifier outputs a load-confirmed signal; and an AND gate coupled to the plurality of operand qualifiers, wherein when each of the plurality of operand qualifiers outputs the load-confirmed signal, the AND gate outputs an all-load-confirmed signal to drive the release circuit to remove the micro-instruction of an entry in the reservation station queue.

9. The scheduler device as claimed in claim 8, wherein each of the plurality of operand qualifiers comprises:

the load-detection counting logic initially latching a first value and changing the latched value every clock cycle;

a first comparator, coupled to the load-detection counting logic, repeatedly comparing a unique identification code on which the first micro-instruction directly depends with a unique identification code carried by the write-back signal and changing the first value to a second value carried by the write-back signal when the unique identification code on which the first micro-instruction directly depends is equal to the unique identification code carried by the write-back signal;

a second comparator, coupled to the load-detection counting logic, continuing to compare the value latched in the load-detection counting logic with a first predetermined value and outputting an enable signal to a third comparator when the latched value is equal to the first predetermined value; and the third comparator, coupled to the second comparator, determining whether the cache access status signal indicates a cache hit or cache miss and outputting the load-confirmed signal when the cache access status signal indicates the cache hit.

10. The scheduler device as claimed in claim 9, wherein the load-detection counting logic is implemented by a 3-bit shift register and shifted by one bit every one clock cycle, the first value is "2'b000", and the first predetermined value is "2'b100".

11. The scheduler device as claimed in claim 8, wherein each of the plurality of operand qualifier comprises:

the load-detection counting logic initially latching a first value and changing the latched value every clock cycle;

a first comparator, coupled to the load-detection counting logic, repeatedly comparing a unique identification code on which the first micro-instruction directly depends with a unique identification code carried by the write-back signal and changing the first value to a second value carried by the write-back signal when the unique identification code on which the first micro-instruction directly depends is equal to the unique identification code carried by the write-back signal;

a second comparator, coupled to the load-detection counting logic, continuing to compare the value latched in the load-detection counting logic with the first predetermined value and outputting a first enable signal to a third comparator when the latched value is equal to the first predetermined value;

the third comparator, coupled to the second comparator, determining whether a first cache access status signal indicates a cache hit or cache miss and outputting the load-confirmed signal when the first cache access status signal indicates the cache hit;

the fourth comparator, coupled to the load-detection counting logic, continuing to compare the value latched in the load-detection counting logic with a second first predetermined value and outputting a second enable signal to a fifth comparator when the latched value is equal to the second predetermined value; and the fifth comparator, coupled to the fourth comparator, determining whether a second cache access status signal indicates a cache hit or cache miss and outputting the load-confirmed signal when the second cache access status signal indicates the cache hit.

12. The scheduler device as claimed in claim 11, wherein the load-detection counting logic is implemented by a 3-bit shift register and shifted by one bit every one clock cycle, the first value is "2'b000", the first predetermined value is "2'b100", and the second predetermined value is "2'b101".

13. The scheduler device as claimed in claim 7, wherein when the execution status of any one of the load micro-instructions is cache miss, the first qualifier drives a scheduler to delete the first micro-instruction from an instruction dispatch unit.

14. The scheduler device as claimed in claim 13, wherein when the execution status of any one of the load micro-instructions is cache miss, the first qualifier retains the first micro-instruction in the reservation station queue from being removed.

* * * * *